(12) United States Patent
Yasusaka et al.

(10) Patent No.: US 10,203,708 B2
(45) Date of Patent: Feb. 12, 2019

(54) POWER REGULATOR TO CONTROL OUTPUT VOLTAGE USING FEEDBACK

(71) Applicant: Rohm Co., Ltd., Kyoto (JP)

(72) Inventors: Makoto Yasusaka, Kyoto (JP); Zhencheng Jin, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/363,164

(22) Filed: Nov. 29, 2016

(65) Prior Publication Data

US 2017/0155315 A1   Jun. 1, 2017

(30) Foreign Application Priority Data

Nov. 30, 2015  (JP) .................................. 2015-233213
Nov. 30, 2015  (JP) .................................. 2015-233214
Nov. 7, 2016   (JP) .................................. 2016-217210

(51) Int. Cl.
*G05F 1/56* (2006.01)
*G05F 1/46* (2006.01)
*H02M 3/158* (2006.01)

(52) U.S. Cl.
CPC .................. *G05F 1/56* (2013.01); *G05F 1/46* (2013.01); *G05F 1/468* (2013.01); *H02M 3/158* (2013.01)

(58) Field of Classification Search
CPC ....................................................... G05F 1/56
See application file for complete search history.

(56) References Cited

U.S. PATENT DOCUMENTS

| 3,656,050 A * | 4/1972 | Airey ...................... H02J 7/244 |
| | | 322/28 |
| 4,160,201 A * | 7/1979 | Ahmed .................... G05F 1/613 |
| | | 323/226 |
| 5,410,241 A * | 4/1995 | Cecil ......................... G05F 3/30 |
| | | 323/312 |
| 2005/0127883 A1 | 6/2005 | Hoshino et al. |
| 2011/0181262 A1* | 7/2011 | Deguchi ................. H02M 1/36 |
| | | 323/284 |
| 2012/0206944 A1* | 8/2012 | Yang ................. H02M 3/33507 |
| | | 363/21.13 |
| 2014/0347028 A1* | 11/2014 | Jayaraj ................ H02M 3/1588 |
| | | 323/282 |
| 2017/0090493 A1* | 3/2017 | Cui ........................ G05F 1/575 |

FOREIGN PATENT DOCUMENTS

JP       3600915        10/2004
JP       2012-249464    12/2012

* cited by examiner

*Primary Examiner* — Jue Zhang
*Assistant Examiner* — Trinh Q Dang
(74) *Attorney, Agent, or Firm* — Fish & Richardson P.C.

(57) ABSTRACT

A power regulator has an input terminal to receive an input voltage, an output terminal to output an output voltage, a transistor connected to the input and terminals, a feedback terminal to receive a feedback voltage, and a control circuit to control the transistor based on the feedback voltage at the feedback terminal and a reference voltage so as to keep the output voltage constant. Various implementations include an open detection circuit to detect an open state of the feedback terminal and, on detecting the open state, to vary the reference voltage and thereby keep the transistor in an OFF state, or a voltage holding circuit configured to hold the output voltage constant at a second voltage lower than the first voltage when the feedback terminal is in an open state.

18 Claims, 22 Drawing Sheets

POWER REGULATOR TO CONTROL OUTPUT VOLTAGE USING FEEDBACK

CROSS-REFERENCE TO RELATED APPLICATIONS

This application is based on the following Japanese patent applications, the contents of which are hereby incorporated by reference:

(1) Japanese Patent Application published as No. 2015-233213 (on Nov. 30, 2015)
(2) Japanese Patent Application published as No. 2015-233214 (on Nov. 30, 2015)
(3) Japanese Patent Application published as No. 2016-217210 (on Nov. 7, 2016)

BACKGROUND OF THE INVENTION

1. Field of the Invention

The present invention relates to power regulators for converting an input voltage into a desired output voltage.

2. Description of Related Art

Power regulators for converting an input voltage into a desired output voltage are used in electronic appliances, OA (office automation) appliances, and the like. These power regulators monitor their output voltage to keep it at the desired level.

Power regulators can be divided roughly into, for example, linear regulators and switching regulators. Linear regulators can be further divided into series regulators and shunt regulators, FIG. 21 is a block diagram of a conventional power regulator, which will now be described with reference to FIG. 21.

In FIG. 21, an integrated circuit device 1 constituting the power regulator 2000 includes a reference voltage source 2, a control circuit 34, an output stage 5, an input terminal IN, an output terminal OUT, and a feedback terminal FB. The integrated circuit device 1 is configured as, for example, a semiconductor integrated circuit device. The integrated circuit device 1 is provided with, in addition to the input terminal IN, the output terminal OUT, and the feedback terminal FB, other external terminals, which are unillustrated. The control circuit 34 includes a controller 3 and a driver circuit 4.

An output terminal of the reference voltage source 2 is connected to a first input terminal T1 of the controller 3 in the control circuit 34. The reference voltage source 2 generates a reference voltage Vref. The reference voltage source 2 is configured as, for example, a bandgap voltage circuit.

A second input terminal T2 of the controller 3 in the control circuit 34 is connected to the feedback terminal FB of the integrated circuit device 1 across a conductor P1. An output terminal of the controller 3 is connected to an input terminal of the driver circuit 4. The controller 3 compares the reference voltage Vref of the reference voltage source 2 with a feedback voltage fed in via the feedback terminal FB, and outputs a control voltage E1 which is commensurate with the result of the comparison. As the controller 3, for example, an error amplifier configured with an operational amplifier is used.

The driver circuit 4 is used to drive the output stage 5. An output terminal of the driver circuit 4 is connected to a gate G of a MOSFET (metal-oxide-semiconductor field-effect transistor), unillustrated, in the output stage 5. The driver circuit 4 operates based on the control voltage E1 from the controller 3, and outputs a drive voltage E2.

An input terminal of the output stage 5 is connected to the input terminal IN of the integrated circuit device 1. To the input terminal IN, an input voltage Vin is applied. An output terminal of the output stage 5 is connected to the output terminal OUT of the integrated circuit device 1. The output stage 5 is driven based on the drive voltage E2 from the driver circuit 4. The output stage 5 generates an output voltage Vout from the input voltage Vin fed in via the input terminal IN, and feeds the output voltage Vout to the output terminal OUT of the integrated circuit device 1.

The output terminal OUT is connected to a node N2. Between the node N2 and a node N1, a resistor R1 is connected. Between the node N1 and a ground terminal (low-potential terminal) GND, a resistor R2 is connected. The resistors R1 and R2 constitute a voltage division circuit 12. The node N1 is connected to the feedback terminal FB of the integrated circuit device 1. The output voltage Vout is divided by the resistors R1 and R2. Thus, a feedback voltage Vfb appears at the node N1, and the feedback voltage Vfb is fed to the feedback terminal FB.

To the output terminal OUT, a load 9 is connected. The load 9 is, for example, a CPU, MPU, sensor, motor, or the like.

In the conventional power regulator 2000, due to an error in mounting the feedback terminal FB, an error in mounting an externally fitted resistor, or any other inadvertent accident or the like, a disconnection (a broken wire or the like) X can occur between the node N1 and the feedback terminal FB, leaving the feedback terminal FB in an open state. This brings the potential at the feedback terminal FB into an indefinite state. With the potential at the feedback terminal FB in an indefinite state, noise or the like may cause the controller 3 to output an abnormal voltage. This inconveniently leads to the load 9 connected to the output terminal OUT operating in an abnormal condition or deteriorating.

FIG. 22 is a schematic diagram showing relevant potentials observed when the power regulator 2000 is operating normally and when the feedback terminal is open. Now, the circuit operation of the power regulator 2000 will be described with reference to FIGS. 21 and 22.

When the power regulator 2000 is operating normally, the feedback voltage Vfb at the feedback terminal FB is stable. Accordingly, the output voltage Vout at the output terminal OUT also is stable.

On the other hand, when the feedback terminal of the power regulator 2000 is open, the feedback voltage Vfb at the feedback terminal FB is indefinite, and the output voltage Vout at the output terminal OUT also is indefinite.

To solve the above problem, various approaches have been adopted

Japanese Patent Application published as No. 2012-249464 (hereinafter Patent Document 1) discloses a DC-DC converter along with an electronic appliance employing it, wherein a capacitor is fitted between a boot conductor, to which the side of a bootstrap circuit opposite from a switching device is connected, and a feedback conductor. The DC-DC converter disclosed in Patent Document 1 takes little time to start outputting an output voltage lower than the input voltage after the time point that the feedback conductor becomes open. This prevents, even with the feedback conductor open, an excessive voltage from being output.

Japanese Patent registered as No. 3600915 (hereinafter Patent Document 2) discloses a switching power supply device along with an electronic appliance incorporating a display device, wherein the peak of the voltage at the series connection node between a coil and a switch in the switching power supply device is detected to serve as a second detection voltage for overvoltage protection. This helps perform overvoltage protection reliably when a feedback circuit or a component such as or a rectification diode is left in open connection, without a need to provide a switching control IC with an additional terminal for overvoltage protection.

With the DC-DC converter and the electronic appliance employing it disclosed in Patent Document 1, the target of application of the technology involved is limited to switching power supplies that include a boot strap circuit. Thus, the technology cannot be applied to linear regulators.

Likewise, with the switching power supply device and the electronic appliance incorporating a display device disclosed in Patent Document 2, the target of application of the technology involved is limited to switching power supplies, and thus the technology cannot be applied to linear regulators.

SUMMARY OF THE INVENTION

In view of the problems mentioned above, an object of the present invention is to provide a power regulator that can almost completely shut off the output of the power regulator when a feedback terminal becomes open due to an error in mounting the feedback terminal, an error in mounting an externally fitted resistor connected to the feedback terminal, or any other inadvertent terminal-opening accident or the like, irrespective of whether the power regulator is a linear regulator or not, what type of switching power supply it is, whether it includes a bootstrap circuit or not, whether it is of a step-down, step-up, or any other type, etc.

According to one aspect of the present invention, a power regulator includes: an input terminal arranged to receive an input voltage; an output terminal arranged to output an output voltage; a transistor connected to the input terminal and to the output terminal; a feedback terminal arranged to receive a feedback voltage having a predetermined relationship with the output voltage; a control circuit configured to control the operation of the transistor based on the feedback voltage and a reference voltage so as to keep the output voltage constant; and an open detection circuit configured to detect an open state of the feedback terminal and, on detecting the open state, to vary the reference voltage and thereby keep the transistor in an OFF state.

According to another aspect of the present invention, a power regulator includes: an input terminal arranged to receive an input voltage; an output terminal arranged to output an output voltage; a transistor connected to the input terminal and to the output terminal; a feedback terminal arranged to receive a feedback voltage having a predetermined relationship with the output voltage; a control circuit configured to control the operation of the transistor based on the feedback voltage and a reference voltage so as to keep the output voltage at a constant first voltage; and a voltage holding circuit configured to hold the output voltage at a constant second voltage lower than the first voltage when the feedback terminal is in an open state.

Other features, elements, steps, benefits, and characteristics of the present invention will become clearer with reference to the following description of preferred embodiments thereof in conjunction with the accompanying drawings.

DETAILED DESCRIPTION OF PREFERRED EMBODIMENTS

First Embodiment

Figure 1:
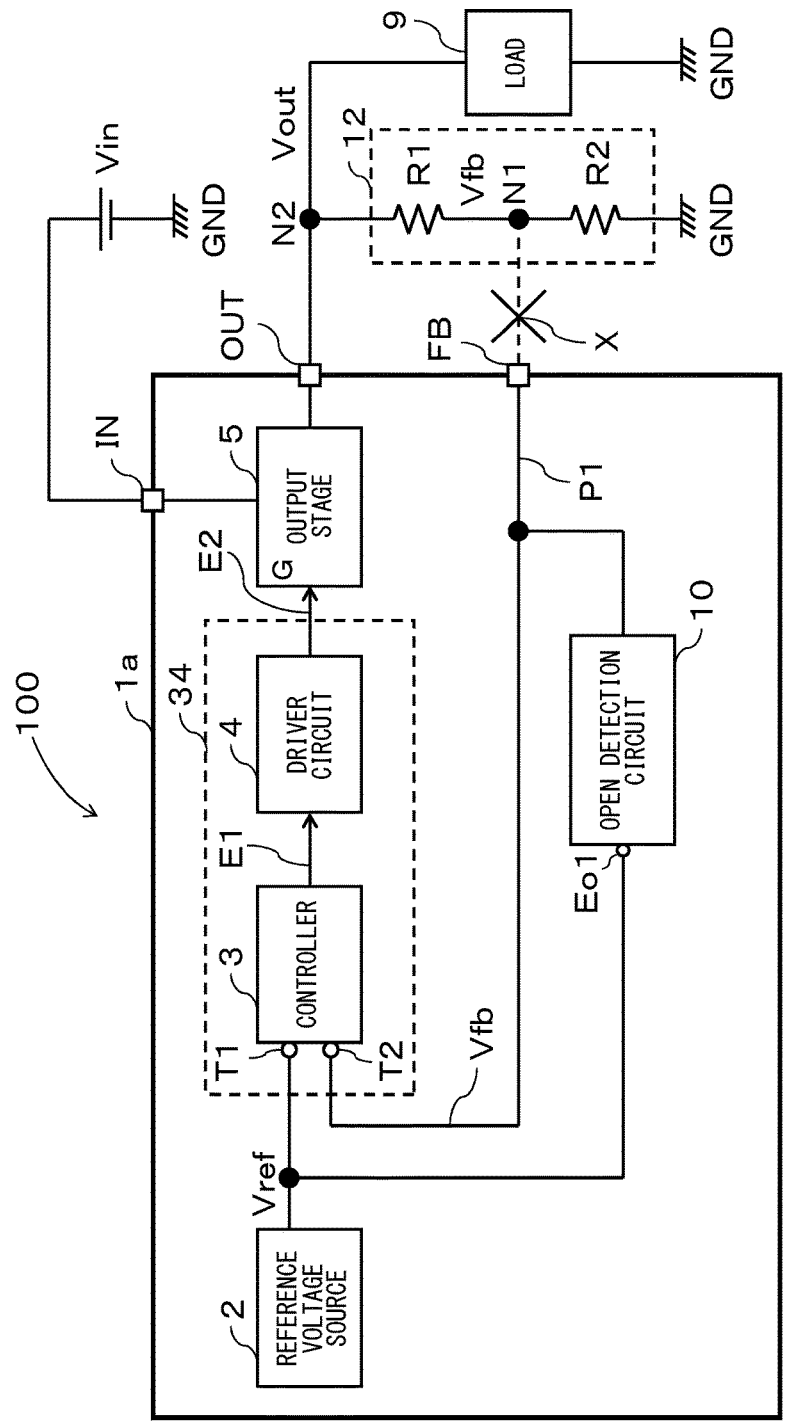
FIG. 1 is a block diagram of a power regulator according to a first embodiment of the present invention.

FIG. 1 is a block diagram of a power regulator according to a first embodiment of the present invention. The power regulator 100 shown in FIG. 1 according to the first embodiment of the present invention is a series regulator, which is one type of linear regulator. Now, the first embodiment of the present invention will be described with reference to the relevant drawings. Components having the same function are identified by the same reference sign, and no overlapping description will be repeated.

Figure 21:
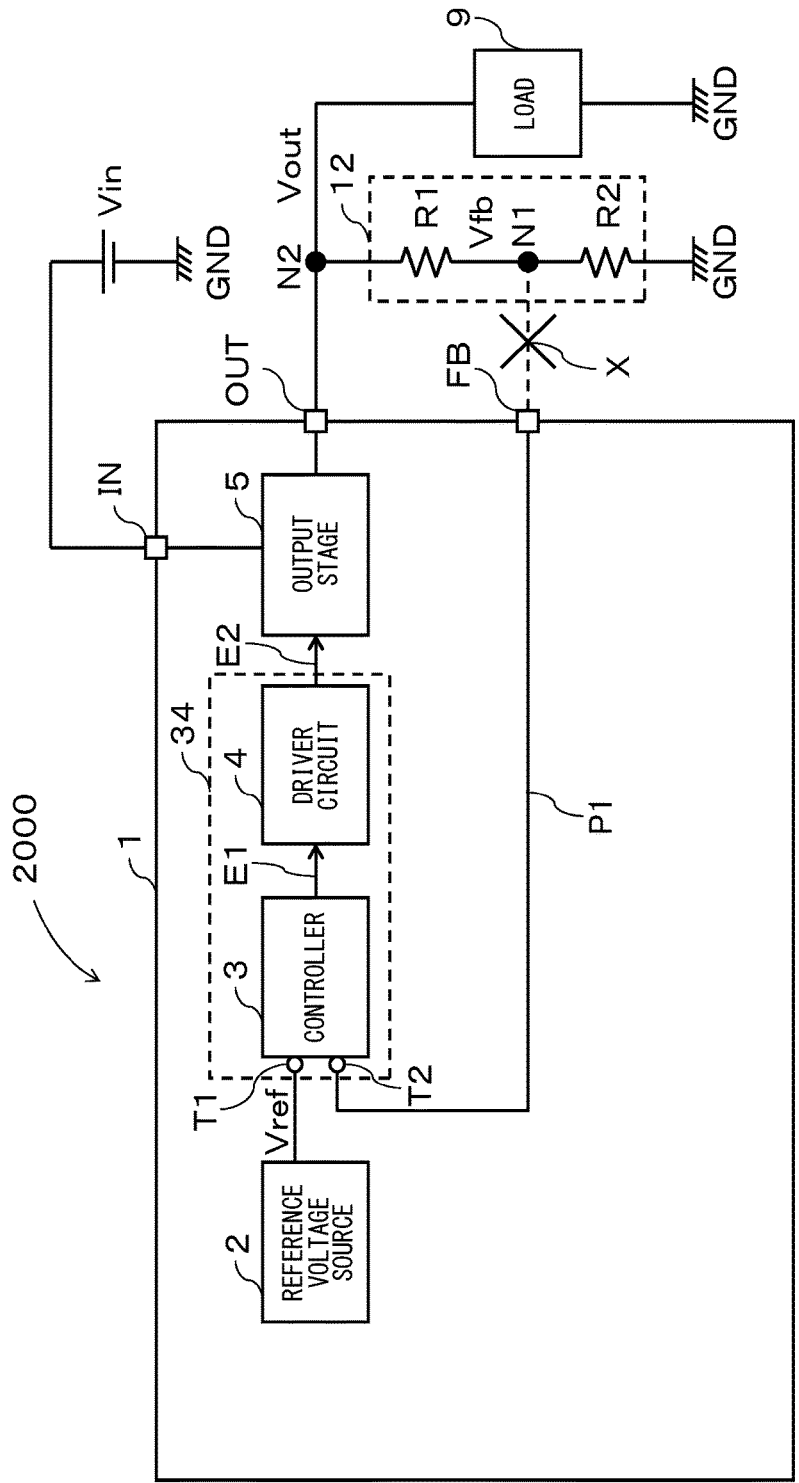
FIG. 21 is a block diagram of a conventional power regulator.
Figure 22:
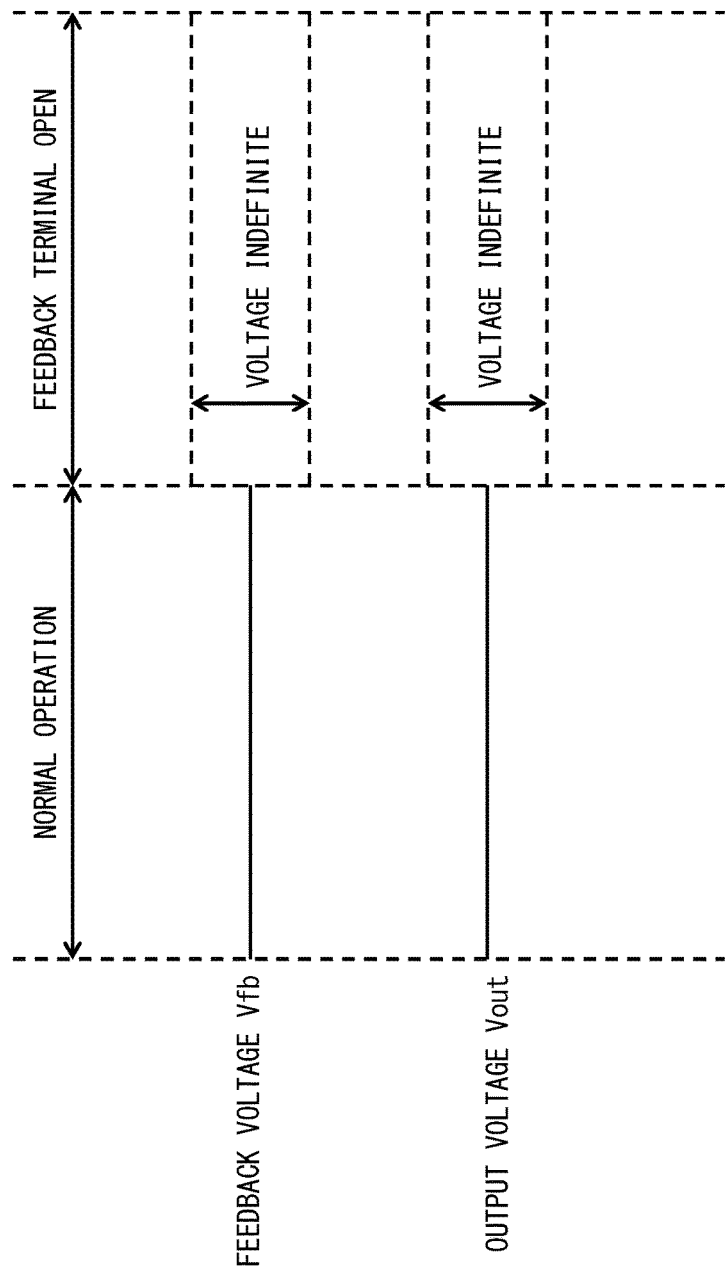
FIG. 22 is a schematic diagram showing relevant potentials observed when the conventional power regulator is operating normally and when the feedback terminal is open.

The power regulator 100 shown in FIG. 1 according to the first embodiment of the present invention differs from the conventional power regulator 2000 shown in FIG. 21 in whether they include an open detection circuit 10 or not.

In FIG. 1, an integrated circuit device 1a constituting the power regulator 100 includes a reference voltage source 2, a control circuit 34, an output stage 5, an open detection circuit 10, an input terminal IN, an output terminal OUT, and a feedback terminal FB. The integrated circuit device 1a is configured as, for example, a semiconductor integrated circuit device. The integrated circuit device 1a is provided with, in addition to the input terminal IN, the output terminal OUT, and the feedback terminal FB, other external terminals, which are unillustrated. The control circuit 34 includes a controller 3 and a driver circuit 4.

An output terminal of the reference voltage source 2 is connected to a first input terminal T1 of the controller 3 in the control circuit 34. The reference voltage source 2 generates a reference voltage Vref. The reference voltage source 2 is configured as, for example, a bandgap voltage circuit. The reference voltage Vref is, for example, from 1 V to 5 V.

A second input terminal T2 of the controller 3 in the control circuit 34 is connected to the feedback terminal FB of the integrated circuit device 1a across a conductor P1. An output terminal of the controller 3 is connected to an input terminal of the driver circuit 4. The controller 3 compares the reference voltage Vref of the reference voltage source 2 with a feedback voltage fed in via the feedback terminal FB, and outputs a control voltage E1 which is commensurate with the result of the comparison. As the controller 3, for example, an error amplifier configured with an operational amplifier is used. The controller 3 includes, for example, a phase compensation circuit, various protection circuits, etc., of which none are illustrated. The various protection circuits include, for example, a temperature protection circuit and an overvoltage protection circuit.

The driver circuit 4 is used to drive the output stage 5. An output terminal of the driver circuit 4 is connected to a gate G of a MOSFET, unillustrated, in the output stage 5. The driver circuit 4 operates based on the control voltage E1 from the controller 3, and outputs a drive voltage E2.

An input terminal of the output stage 5 is connected to the input terminal IN of the integrated circuit device 1a. To the input terminal IN, an input voltage Vin is applied. An output terminal of the output stage 5 is connected to the output terminal OUT of the integrated circuit device 1a. The output stage 5 operates based on the drive voltage E2 from the driver circuit 4. The output stage 5 generates an output voltage Vout from the input voltage Vin fed in via the input terminal IN, and feeds the output voltage Vout to the output terminal OUT of the integrated circuit device 1a. The integrated circuit device 1a is of a step-down type, and the output voltage Vout is lower than the input voltage Vin. Incidentally, in a case where the output stage 5 can operate normally even with the voltage difference between the input terminal IN and the output terminal OUT, for example, less than 1 V, this is particularly called an LDO (low-dropout) power supply. The power regulator 100 according to the first embodiment of the present invention is applicable to linear regulators in general including LDO power supplies. The input voltage Vin is, for example, from 2.5 V to 100 V. The output voltage Vout is, for example, from 0.6 V to 40 V.

The output terminal OUT is connected to a node N2. Between the node N2 and a node N1, a resistor R1 is connected. Between the node N1 and a ground terminal (low-potential terminal) GND, a resistor R2 is connected. The resistors R1 and R2, which are externally fitted, constitute a voltage division circuit 12. The node N1 is connected to the feedback terminal FB of the integrated circuit device 1a. The output voltage Vout is divided by the resistors R1 and R2. Thus, a feedback voltage Vfb appears at the node N1, and the feedback voltage Vfb is fed to the feedback terminal FB. The resistors R1 and R2 are each, for example, from several kilohms to several megohms.

To the output terminal OUT, a load 9 is connected via the node N2. The load 9 is, for example, a CPU, MPU, sensor, motor, or the like.

An input terminal of the open detection circuit 10 is connected to the feedback terminal FB. An output terminal Eo1 of the open detection circuit 10 is connected to the output terminal of the reference voltage source 2, that is, to the same terminal as that from which the reference voltage Vref is output. The open detection circuit 10 detects the feedback terminal FB being open due to a disconnection (a broken wire or the like) X between the node N1 and the feedback terminal FB, and then sets the reference voltage Vref output from the 2 at a predetermined voltage. Here, the predetermined voltage is a voltage (for example, 0 V) sufficiently lower than the initially set value of the reference voltage Vref. Thus, the controller 3, the driver circuit 4, and the output stage 5 are driven to turn the output voltage Vout to 0 V. In this way, the load 9 connected to the output terminal OUT can be prevented from deterioration and destruction.

As mentioned earlier, linear regulators are divided roughly into series regulators and shunt regulators. Like the series regulator described above, a shunt regulator has a feedback terminal, and compares a feedback voltage fed to the feedback terminal with a reference voltage to keep the output voltage at a predetermined value. Thus, the present invention is applicable also to shunt regulators, which are one type of linear regulators.

Figure 2:
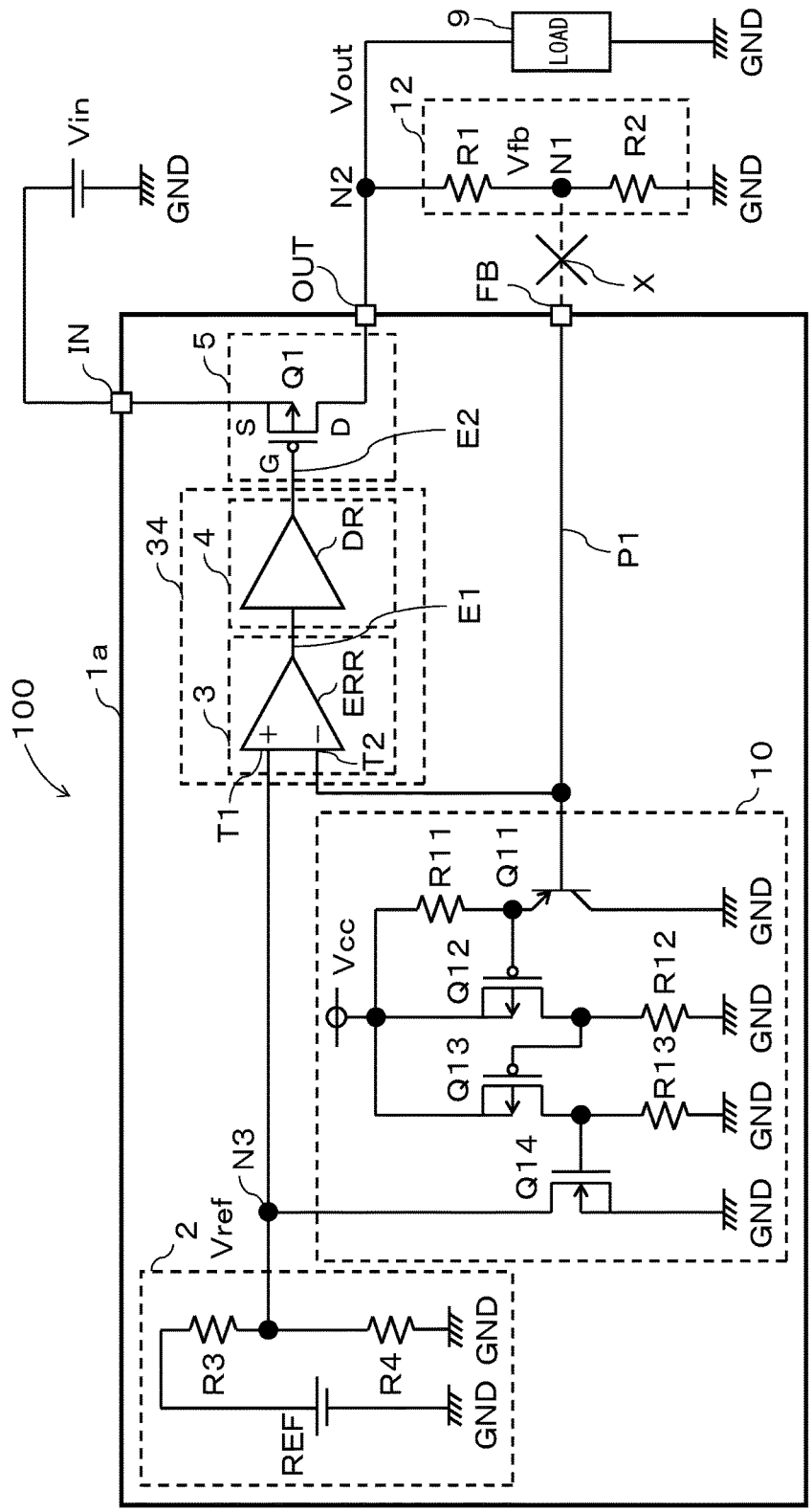
FIG. 2 is a circuit diagram showing one example of the power regulator shown in FIG. 1 according to the first embodiment of the present invention.

FIG. 2 shows a specific circuit configuration of the power regulator 100 according to the first embodiment of the present invention.

The reference voltage source 2 is composed of a voltage source REF and resistors R3 and R4. The voltage source REF is configured as, for example, a bandgap voltage circuit. The voltage of the voltage source REF is divided by the resistors R3 and R4, so that the reference voltage source 2 outputs a reference voltage Vref. The resistors R3 and R4 are each, for example, from several kilohms to several megohms. The reference voltage Vref is, for example, from 1 V to 5 V.

The controller 3 includes an error amplifier ERR. The error amplifier ERR is configured, specifically, with an operational amplifier. In FIG. 2, a non-inverting input terminal (+) corresponds to the first input terminal T1 in FIG. 1, and an inverting input terminal (−) corresponds to the second input terminal T2 in FIG. 1. With this circuit configuration, a feedback voltage Vfb is negatively fed back to the error amplifier ERR in the integrated circuit device 1a.

The driver circuit 4 includes a driver DR composed of a single transistor or a plurality of transistors. The driver DR is used to sufficiently drive the output stage 5 in the succeeding stage, or is used as a so-called buffer for preventing interference between the controller 3 and the output stage 5. Accordingly, in a case where the controller 3 itself has such functions, the driver DR is unnecessary.

The output stage 5 includes a control device Q1 (for example, a PMOS transistor, referred to also as the transistor Q1 in the following description). As the control device Q1, instead of a PMOS transistor, a bipolar transistor may be used.

The open detection circuit 10 includes a PNP transistor Q11, a PMOS transistor Q12, a PMOS transistor Q13, an NMOS transistor Q14, a resistor R11, a resistor R12, and a resistor 13. The open detection circuit 10 sets the reference voltage Vref at a predetermined potential when the feedback terminal FB lapses into an open state. Here, the predetermined potential is a potential sufficiently lower than the initially set level of the reference voltage Vref, and is, for example, 0 V or a potential close to 0 V.

Although one example of the open detection circuit 10 is shown in FIG. 2, this is not meant to limit the circuit configuration of the open detection circuit 10. For example, instead of the resistors R12 and R13, a constant-current source may be used. The PMOS transistor Q12, the PMOS transistor Q13, and the NMOS transistor Q14 may be replaced with bipolar transistors.

Next, the circuit configuration of, and circuit interconnection in, the power regulator 100 will be described.

In the reference voltage source 2, between a positive terminal and a ground terminal (low-potential terminal) of the voltage source REF, the resistors R3 and R4 are connected in series. The non-inverting input terminal (+) of the error amplifier ERR in the controller 3 is connected via a node N3 to between the resistors R3 and R4 in the reference voltage source 2. The inverting input terminal (−) of the error amplifier ERR in the controller 3 is connected to the feedback terminal FB. An output terminal of the error amplifier ERR in the controller 3 is connected to an input terminal of the driver DR in the driver circuit 4. An output terminal of the driver DR in the driver circuit 4 is connected to a gate G of the PMOS transistor Q1 in the output stage 5. A source S of the PMOS transistor Q1 in the output stage 5 is connected to the input terminal IN. A drain D of the PMOS transistor Q1 in the output stage 5 is connected to the output terminal OUT.

To the input terminal IN, an input voltage Vin is fed. The input voltage Vin is, for example, from 2.5 V to 100 V. The output voltage Vout is, for example, from 0.6 V to 40 V.

The output terminal OUT is connected to the node N2. Between the nodes N1 and N2, the resistor R1 is connected. Between the node N1 and the ground terminal (low-potential terminal) GND, the resistor R2 is connected. The resistors R1 and R2 constitute a voltage division circuit 12. The node N1 is connected to the feedback terminal FB of the integrated circuit device 1a. The output voltage Vout is divided by the resistors R1 and R2. Thus, a feedback voltage Vfb appears at the node N1, and the feedback voltage Vfb is fed to the feedback terminal FB. The resistors R1 and R2 are each, for example, from several kilohms to several megohms.

To the output terminal OUT, a load 9 is connected via the node N2. The load 9 is, for example, a CPU, MPU, sensor, motor, or the like.

In the open detection circuit 10, a base B of the bipolar transistor Q11 is connected to the feedback terminal FB. A collector C of the bipolar transistor Q11 is connected to the ground terminal (low-potential terminal) GND. An emitter E of the bipolar transistor Q11 is connected via the resistor R11 to a power terminal (high-potential terminal) Vcc. The emitter E of the bipolar transistor Q11 is connected also to a gate of the PMOS transistor Q12. A source of the PMOS transistor Q12 is connected to the power terminal (high-potential terminal) Vcc. A drain of the PMOS transistor Q12 is connected via the resistor R12 to the ground terminal (low-potential terminal) GND. The drain of the PMOS transistor Q12 is connected also to a gate of the PMOS transistor Q13. A source of the PMOS transistor Q13 is connected to the power terminal (high-potential terminal) Vcc. A drain of the PMOS transistor Q13 is connected via the resistor R13 to the ground terminal (low-potential terminal) GND. The drain of the PMOS transistor Q13 is connected also to a gate of the NMOS transistor Q14. A source of the NMOS transistor Q14 is connected to the ground terminal (low-potential terminal) GND. A drain of the NMOS transistor Q14 is connected to the node N3.

Next, the signal flows in, and circuit operation of, the integrated circuit device 1a shown in FIG. 2 as observed when the feedback terminal FB is in a normal state will be described.

The error amplifier ERR in the controller 3 compares a reference voltage Vref output from the reference voltage source 2 with a feedback voltage Vfb fed from the feedback terminal FB, and outputs a control voltage E1 which is commensurate with the result of the comparison. Based on the control voltage E1, the driver DR in the driver circuit 4 outputs a drive voltage E2. Based on the drive voltage E2, the PMOS transistor Q1 in the output stage 5 generates an output voltage Vout from an input voltage Vin, and feeds the output voltage Vout to the output terminal OUT. The output voltage Vout is divided by the resistors R1 and R2, so that a feedback voltage Vfb is fed to the feedback terminal FB. The input voltage Vin is, for example, from 2.5 V to 100 V. The output voltage Vout is, for example, from 0.6 V to 40 V.

When the feedback voltage Vfb is fed to the feedback terminal FB, the bipolar transistor Q11 in the open detection circuit 10 turns ON. Thus, to the gate of the PMOS transistor Q12 is applied a voltage which is the sum of the feedback voltage Vfb and the base-emitter forward voltage of the bipolar transistor Q11. Here, if the voltage at the power terminal (high-potential terminal) Vcc is higher than the sum of the feedback voltage Vfb and the base-emitter forward voltage of the bipolar transistor Q11, the PMOS transistor Q12 turns ON. Thus, the voltage at the power terminal (high-potential terminal) Vcc is applied to the gate of the PMOS transistor Q13, and the PMOS transistor Q13 turns OFF. Accordingly, the gate of the NMOS transistor Q14 turns to 0 V or a value close to it, and the NMOS transistor Q14 turns OFF. As a result, the reference voltage Vref is fed to the non-inverting input terminal (+) of the error amplifier ERR in the controller 3.

As described above, when the power regulator 100 shown in FIG. 2 according to the first embodiment of the present invention is operating normally, the controller 3, the driver circuit 4, and the output stage 5 are controlled so as to keep the output voltage Vout constant.

Next, the signal flows in, and circuit operation of, the integrated circuit device 1a shown in FIG. 2 as observed when the feedback terminal FB is in an open state will be described.

When the feedback terminal FB lapses into an open state, the base B of the bipolar transistor Q11 slips into an indefinite state; however, the path through which the base current of the bipolar transistor Q11 passes is cut off, and thus the bipolar transistor Q11 in the open detection circuit 10 turns OFF. Thus, the voltage at the power terminal (high-potential terminal) Vcc is applied to the gate of the PMOS transistor Q12, and the PMOS transistor Q12 turns OFF. Accordingly, the gate of the PMOS transistor Q13 turns to 0 V, and the PMOS transistor Q13 turns ON. Thus, the voltage at the power terminal (high-potential terminal) Vcc is applied to the gate of the NMOS transistor Q14, and the NMOS transistor Q14 turns ON. As a result, the reference voltage Vref turns to 0 V, which is the potential at the ground terminal (low-potential terminal) GND, or a value close to it.

With the reference voltage Vref fed to the non-inverting input terminal (+) of the error amplifier ERR approximately equal to 0 V, when noise or the like is fed to the inverting input terminal (−) of the error amplifier ERR in the controller 3, the controller 3, the driver circuit 4, and the output stage 5 are controlled to turn the output voltage Vout to 0 V.

As described above, when the feedback terminal FB of the integrated circuit device 1a lapses into an open state, the open detection circuit 10 turns the reference voltage Vref output from the reference voltage source 2 to 0 V or a potential close to 0 V. Thus, the controller 3 is prevented from outputting an abnormal voltage due to noise or the like. In this way, the load 9 connected to the output terminal OUT is prevented from deterioration and destruction.

Second Embodiment

Figure 3:
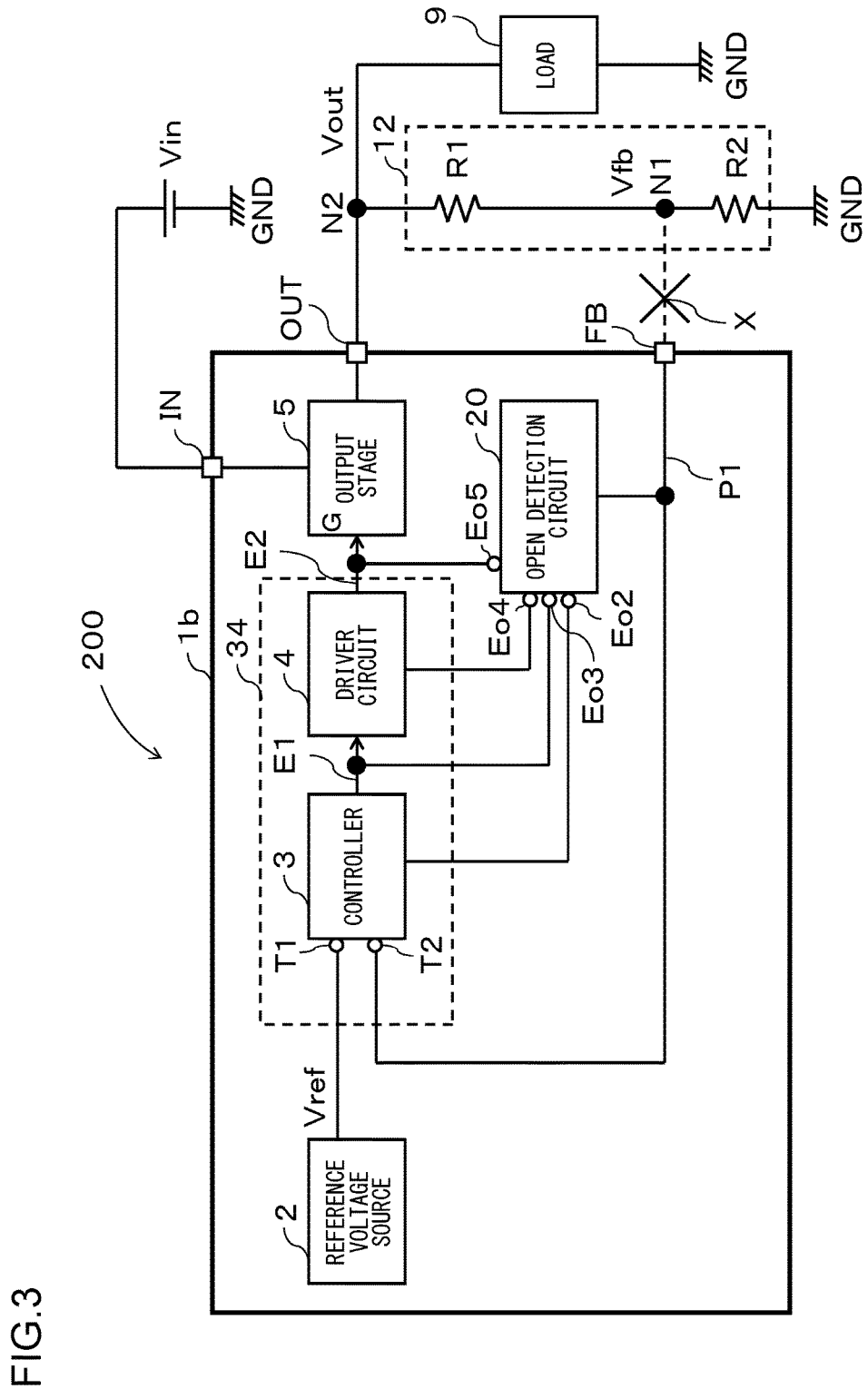
FIG. 3 is a block diagram of a power regulator according to a second embodiment of the present invention.

FIG. 3 is a block diagram of a power regulator according to a second embodiment of the present invention. The power regulator 200 shown in FIG. 3 according to the second embodiment of the present invention is, like the one shown in FIG. 1, a series regulator. Now, the second embodiment of the present invention will be described with reference to the relevant drawings.

The power regulator 200 shown in FIG. 3 according to the second embodiment of the present invention differs from the power regulator 100 shown in FIG. 1 according to the first embodiment of the present invention in the number of output terminals of the open detection circuit and where they are connected. In the power regulator 200 shown in FIG. 3 according to the second embodiment of the present invention, the reference voltage Vref generated by the reference voltage source 2 is not controlled, and from this aspect arise the differences from the power regulator 100 shown in FIGS. 1 and 2 according to the first embodiment.

In FIG. 3, an integrated circuit device 1b constituting the power regulator 200 includes a reference voltage source 2, a control circuit 34, an output stage 5, an open detection circuit 20, an input terminal IN, an output terminal OUT, and a feedback terminal FB. The integrated circuit device 1b is configured as, for example, a semiconductor integrated circuit device. The integrated circuit device 1b is provided with, in addition to the input terminal IN, the output terminal OUT, and the feedback terminal FB, other external terminals, which are unillustrated. The control circuit 34 includes a controller 3 and a driver circuit 4.

An output terminal of the reference voltage source 2 is connected to a first input terminal T1 of the controller 3 in the control circuit 34. The reference voltage source 2 generates a reference voltage Vref. The reference voltage source 2 is configured as, for example, a bandgap voltage circuit. The reference voltage Vref is, for example, from 1 V to 5 V.

A second input terminal T2 of the controller 3 in the control circuit 34 is connected to the feedback terminal FB of the integrated circuit device 1b across a conductor P1. An output terminal of the controller 3 is connected to an input terminal of the driver circuit 4. The controller 3 compares the reference voltage Vref of the reference voltage source 2 with a feedback voltage fed in via the feedback terminal FB, and outputs a control voltage E1 which is commensurate with the result of the comparison. As the controller 3, for example, an error amplifier configured with an operational amplifier is used. The controller 3 includes, for example, a phase compensation circuit, various protection circuits, etc., of which none are illustrated. The various protection circuits include, for example, a temperature protection circuit and an overvoltage protection circuit.

The driver circuit 4 is used to drive the output stage 5. An output terminal of the driver circuit 4 is connected to a gate G of a MOSFET, unillustrated, in the output stage 5. The driver circuit 4 operates based on the control voltage E1 from the controller 3, and outputs a drive voltage E2.

An input terminal of the output stage 5 is connected to the input terminal IN of the integrated circuit device 1b. To the input terminal IN, an input voltage Vin is applied. An output terminal of the output stage 5 is connected to the output terminal OUT of the integrated circuit device 1b. The output stage 5 operates based on the drive voltage E2 from the driver circuit 4. The output stage 5 generates an output voltage Vout from the input voltage Vin fed in via the input terminal IN, and feeds the output voltage Vout to the output terminal OUT of the integrated circuit device 1b. The integrated circuit device 1b is of a step-down type, and the output voltage Vout is lower than the input voltage Vin. The power regulator 200 according to the second embodiment of the present invention is applicable to linear regulators in general including LDO power supplies. The input voltage Vin is, for example, from 2.5 V to 100 V. The output voltage Vout is, for example, from 0.6 V to 40 V.

The output terminal OUT is connected to a node N2. Between the node N2 and a node N1, a resistor R1 is connected. Between the node N1 and a ground terminal (low-potential terminal) GND, a resistor R2 is connected. The resistors R1 and R2 constitute a voltage division circuit 12. The node N1 is connected to the feedback terminal FB of the integrated circuit device 1b. The output voltage Vout is divided by the resistors R1 and R2. Thus, a feedback voltage Vfb appears at the node N1, and the feedback voltage Vfb is fed to the feedback terminal FB. The resistors R1 and R2 are each, for example, from several kilohms to several megohms.

To the output terminal OUT, a load 9 is connected via the node N2. The load 9 is, for example, a CPU, MPU, sensor, motor, or the like.

An input terminal of the open detection circuit 20 is connected to the feedback terminal FB. The open detection circuit 20 is provided with four output terminals, namely a first to a fourth output terminal Eo2 to Eo5. The first output terminal Eo2 is connected to the controller 3. The second output terminal Eo3 is connected to the output terminal of the controller 3. The third output terminal Eo4 is connected to the driver circuit 4. The fourth output terminal Eo5 is connected to the output terminal of the driver circuit 4. Although the open detection circuit 20 in the power regulator 200 shown in FIG. 3 is provided with four output terminals, namely the first to fourth output terminals Eo2 to Eo4, not all of these output terminals need to be provided: at least one of the first to fourth output terminals Eo2 to Eo4 has only to be provided.

In the power regulator 200 shown in FIG. 3 according to the second embodiment of the present invention, as in the power regulator 100 shown in FIG. 1 according to the first embodiment, during normal operation, the controller 3, the driver circuit 4, and the output stage 5 are controlled so as to keep the output voltage Vout constant, and the open detection circuit 20 does not operate.

On the other hand, when the feedback terminal FB is detected being in an open state, the open detection circuit 20 stops the operation of the controller 3 and the driver circuit 4. Moreover, to turn off, for example, the PMOS and NMOS transistors, etc. in the output stage 5, the open detection circuit 20 connects the signal path between the controller 3 and the driver circuit 4 to the power terminal (high-potential terminal) or the ground terminal (low-potential terminal) to hold the control voltage E1 at HIGH or LOW level. Likewise, the open detection circuit 20 holds the drive voltage E2 at HIGH or LOW level. That is, the control voltage E1 and the drive voltage E2 are held at the levels that keep the output stage 5 OFF. As a result, the operation of the output stage 5 is stopped and the output stage 5 ceases to output the output voltage Vout. In this way, the load 9 connected to the output terminal OUT is prevented from deterioration and destruction.

The power regulator 200 shown in FIG. 3 according to the second embodiment does not control the reference voltage Vref of the reference voltage source 2 but instead controls at least one of voltages at the controller 3, at the driver circuit 4, and at a circuit-to-circuit node around them. Even then, as a result of all the voltages at those circuits and circuit-to-circuit node which are targets of control being controlled, even if, for example, the control of the controller 3 is insufficient, the voltages at the other circuits and circuit-to-circuit node are controlled, and thus the output voltage Vout is reliably kept at a predetermined level. Thus, it is preferable that all of the circuits and circuit-to-circuit node which are targets of control be controlled. Although all those voltages should best be controlled, not all need to be controlled.

Figure 4:
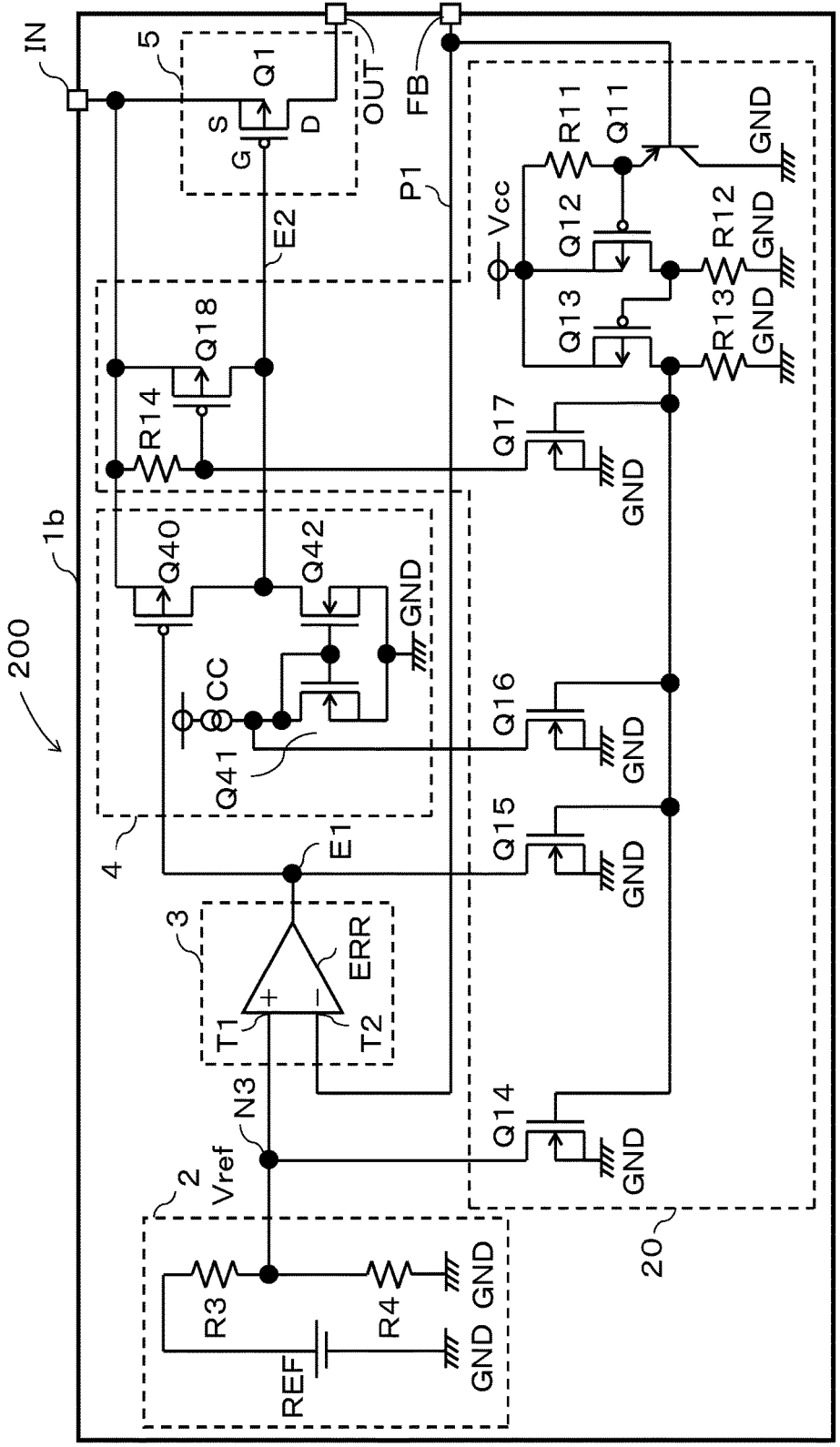
FIG. 4 is a circuit diagram showing one example of the power regulator shown in FIG. 3 according to the second embodiment of the present invention.

FIG. 4 shows a specific circuit configuration of the power regulator 200 shown in FIG. 3 according to the second embodiment of the present invention.

The reference voltage source 2 is composed of a voltage source REF and resistors R3 and R4. The voltage source REF is configured as, for example, a bandgap voltage circuit. The voltage of the voltage source REF is divided by the resistors R3 and R4, so that the reference voltage source 2 outputs a reference voltage Vref. The resistors R3 and R4 are each, for example, from several kilohms to several megohms. The reference voltage Vref is, for example, from 1 V to 5 V.

The controller 3 includes an error amplifier ERR. The error amplifier ERR is configured, specifically, with an operational amplifier. In FIG. 4, a non-inverting input terminal (+) corresponds to the first input terminal T1 in FIG. 3, and an inverting input terminal (−) corresponds to the second input terminal T2 in FIG. 3. With this circuit configuration, a feedback voltage Vfb is negatively fed back to the error amplifier ERR in the integrated circuit device 1b.

The driver circuit 4 includes, for example, a constant-current source CC, a PMOS transistor Q40, an NMOS transistor Q41, and an NMOS transistor Q42.

The output stage 5 includes a control device Q1 (for example, a PMOS transistor). As the control device Q1, instead of a PMOS transistor, an NMOS transistor may be used, or a bipolar transistor may be used.

The open detection circuit 20 includes a PNP transistor Q11, a PMOS transistor Q12, a PMOS transistor Q13, an NMOS transistor Q14, an NMOS transistor Q15, an NMOS transistor Q16, an NMOS transistor Q17, a PMOS transistor Q18, a resistor R11, a resistor R12, a resistor R13, and a resistor R14. When the feedback terminal FB lapses into an open state, the open detection circuit 20 sets the reference voltage Vref at a predetermined potential. Here, the predetermined potential is a potential sufficiently lower than the initially set level of the reference voltage Vref, and is, for example, 0 V or a potential close to it. Moreover, the open detection circuit 20 holds the control voltage E1 and the drive voltage E2 at HIGH or LOW level. Furthermore, the open detection circuit 20 stops the driver circuit 4. Here, HIGH and LOW levels do not necessarily refer to the input voltage Vin and the 0 V potential at the ground terminal, but refer to such potentials as turn ON and OFF the circuits connected in succeeding stages.

While one example of the open detection circuit 20 is shown in FIG. 4, this is not meant to limit the circuit configuration of the open detection circuit 20. For example, instead of the resistors R12 and R13, a constant-current source may be used. For another example, the PMOS transistor Q12, the PMOS transistor Q13, the NMOS transistor Q14, the NMOS transistor Q15, the NMOS transistor Q16, the NMOS transistor Q17, and the PMOS transistor Q18 may be replaced with bipolar transistors.

Next, the circuit configuration of, and circuit interconnection in, the power regulator 200 will be described.

In the reference voltage source 2, between a positive terminal and a ground terminal (low-potential terminal) of the voltage source REF, the resistors R3 and R4 are connected in series. The non-inverting input terminal (+) of the error amplifier ERR in the controller 3 is connected via a node N3 to between the resistors R3 and R4 in the reference voltage source 2. The inverting input terminal (−) of the error amplifier ERR in the controller 3 is connected to the feedback terminal FB.

An output terminal of the error amplifier ERR in the controller 3 is connected to a gate of the PMOS transistor Q40 in the driver circuit 4. A source of the PMOS transistor Q40 is connected to the input terminal IN. A drain of the PMOS transistor Q40 is connected to a drain of the NMOS transistor Q42. A source of the NMOS transistor Q42 is connected to a ground terminal (low-potential terminal) GND. A gate of the NMOS transistor Q42, a gate of the NMOS transistor Q41, and a drain of the NMOS transistor Q41 are connected together. A source of the NMOS transistor Q41 is connected to the ground terminal (low-potential terminal) GND. To the drain of the NMOS transistor Q41, the constant-current source CC is connected. Thus, the constant-current source CC, the NMOS transistor Q41, and the NMOS transistor Q42 constitute a current-mirror circuit. The current generated by the current-mirror circuit is used as the load current of the PMOS transistor Q40. The load current of the PMOS transistor Q40 is set as desired through adjustment of the so-called mirror ratio of the current-mirror circuit.

A gate G of the PMOS transistor Q1 in the output stage 5 is connected to the common node between the PMOS transistor Q40 and the NMOS transistor Q42 in the driver circuit 4. A source S of the PMOS transistor Q1 in the output stage 5 is connected to the input terminal IN. A drain D of the PMOS transistor Q1 in the output stage 5 is connected to the output terminal OUT.

In the open detection circuit 20, a base of the bipolar transistor Q11 is connected to the feedback terminal FB. A collector of the bipolar transistor Q11 is connected to the ground terminal (low-potential terminal) GND. An emitter of the bipolar transistor Q11 is connected via the resistor R11 to a power terminal (high-potential terminal) Vcc. The emitter of the bipolar transistor Q11 is connected also to a gate of the PMOS transistor Q12. A source of the PMOS transistor Q12 is connected to the power terminal (high-potential terminal) Vcc. A drain of the PMOS transistor Q12 is connected via the resistor R12 to the ground terminal (low-potential terminal) GND. The drain of the PMOS transistor Q12 is connected also to a gate of the PMOS transistor Q13. A source of the PMOS transistor Q13 is connected to the power terminal (high-potential terminal)

Vcc. A drain of the PMOS transistor Q13 is connected via the resistor 13 to the ground terminal (low-potential terminal) GND. The drain of the PMOS transistor Q13 is connected also to a gate of the NMOS transistor Q14, a gate of the NMOS transistor Q15, a gate of the NMOS transistor Q16, and a gate of the NMOS transistor Q17. A source of the NMOS transistor Q14, a source of the NMOS transistor Q15, a source of the NMOS transistor Q16, and a source of the NMOS transistor Q17 are connected to the ground terminal (low-potential terminal) GND. A drain of the NMOS transistor Q14 is connected to a node N3. A drain of the NMOS transistor Q15 is connected to the output terminal of the error amplifier ERR in the controller 3. A drain of the NMOS transistor Q16 is connected to the drain of the NMOS transistor Q41 in the driver circuit 4. A drain of the NMOS transistor Q17 is connected via the resistor R14 to the input terminal IN. A gate of the PMOS transistor Q18 is connected to the drain of the NMOS transistor Q17. A source of the PMOS transistor Q18 is connected to the input terminal IN. A drain of the PMOS transistor Q18 is connected to the gate of the PMOS transistor Q1 in the output stage 5.

Next, the signal flows in, and circuit operation of, the integrated circuit device 1b shown in FIG. 4 as observed when the feedback terminal FB is in a normal state will be described.

The error amplifier ERR in the controller 3 compares a reference voltage Vref output from the reference voltage source 2 with a feedback voltage Vfb fed from the feedback terminal FB, and outputs a control voltage E1 which is commensurate with the result of the comparison. Based on the control voltage E1, the PMOS transistor Q40 in the driver circuit 4 outputs a drive voltage E2. Based on the drive voltage E2, the PMOS transistor Q1 in the output stage 5 generates an output voltage Vout from an input voltage Vin, and feeds the output voltage Vout to the output terminal OUT. The output voltage Vout is divided by the resistors R1 and R2, so that a feedback voltage Vfb is fed to the feedback terminal FB. The input voltage Vin is, for example, from 2.5 V to 100 V. The output voltage Vout is, for example, from 0.6 V to 40 V.

When the feedback voltage Vfb is fed to the feedback terminal FB, the bipolar transistor Q11 in the open detection circuit 10 turns ON. Thus, to the gate of the PMOS transistor Q12 is applied a voltage which is the sum of the feedback voltage Vfb and the base-emitter forward voltage of the bipolar transistor Q11. Here, if the voltage at the power terminal (high-potential terminal) Vcc is higher than the sum of the feedback voltage Vfb and the base-emitter forward voltage of the bipolar transistor Q11, the PMOS transistor Q12 turns ON. Thus, a voltage close to that at the power terminal (high-potential terminal) Vcc is applied to the gate of the PMOS transistor Q13, and the PMOS transistor Q13 turns OFF. Accordingly, the gate of the NMOS transistor Q14 turns to LOW level, preferably 0 V, and the NMOS transistor Q14 turns OFF. As a result, the reference voltage Vref is fed, as it is, to the non-inverting input terminal (+) of the error amplifier ERR in the controller 3. Moreover, the gates of the NMOS transistors Q15, Q16, and Q17 turn to 0 V, and the NMOS transistors Q15, Q16, and Q17 turn OFF. As the NMOS transistor Q17 turns OFF, the PMOS transistor Q18 turns OFF.

As described above, when the power regulator 200 shown in FIG. 4 according to the second embodiment of the present invention is operating normally, the controller 3, the driver circuit 4, and the output stage 5 are controlled so as to keep the output voltage Vout constant.

Next, the signal flows in, and circuit operation of, the integrated circuit device 1b shown in FIG. 4 as observed when the feedback terminal FB is in an open state will be described.

When the feedback terminal FB lapses into an open state, the base B of the bipolar transistor Q11 slips into an indefinite state; however, the path through which the base current of the bipolar transistor Q11 passes is cut off, and thus the bipolar transistor Q11 in the open detection circuit 20 turns OFF. Thus, the voltage at the power terminal (high-potential terminal) Vcc is applied to the gate of the PMOS transistor Q12, and the PMOS transistor Q12 turns OFF. Accordingly, the gate of the PMOS transistor Q13 turns to almost 0 V, and the PMOS transistor Q13 turns ON. Thus, the voltage at the power terminal (high-potential terminal) Vcc is applied to the gates of the NMOS transistors Q14, Q15, Q16, and Q17. As the NMOS transistor Q14 turns ON, the reference voltage Vref turns to LOW level, preferably 0 V, which equals the potential at the ground terminal (low-potential terminal) GND. Moreover, as the NMOS transistor Q15 turns ON, the control voltage E1 from the controller 3 is held at 0 V. Furthermore, as the NMOS transistor Q16 turns ON, the current from the constant-current source CC now passes, not through the NMOS transistor Q41, but through the NMOS transistor Q16; thus, the load current of the PMOS transistor Q40 is shut off, and the operation of the driver circuit 4 is stopped. Moreover, as the NMOS transistor Q17 turns ON, the PMOS transistor Q18 turns ON, and the PMOS transistor Q1 in the output stage 5 is held OFF.

As described above, when the feedback terminal FB of the integrated circuit device 1a lapses into an open state, the PMOS transistor Q1 in the output stage 5 is driven to turn OFF. Thus, the controller 3 is prevented from outputting an abnormal voltage due to noise or the like. In this way, the load 9 connected to the output terminal OUT is prevented from deterioration and destruction.

Third Embodiment

Figure 5:
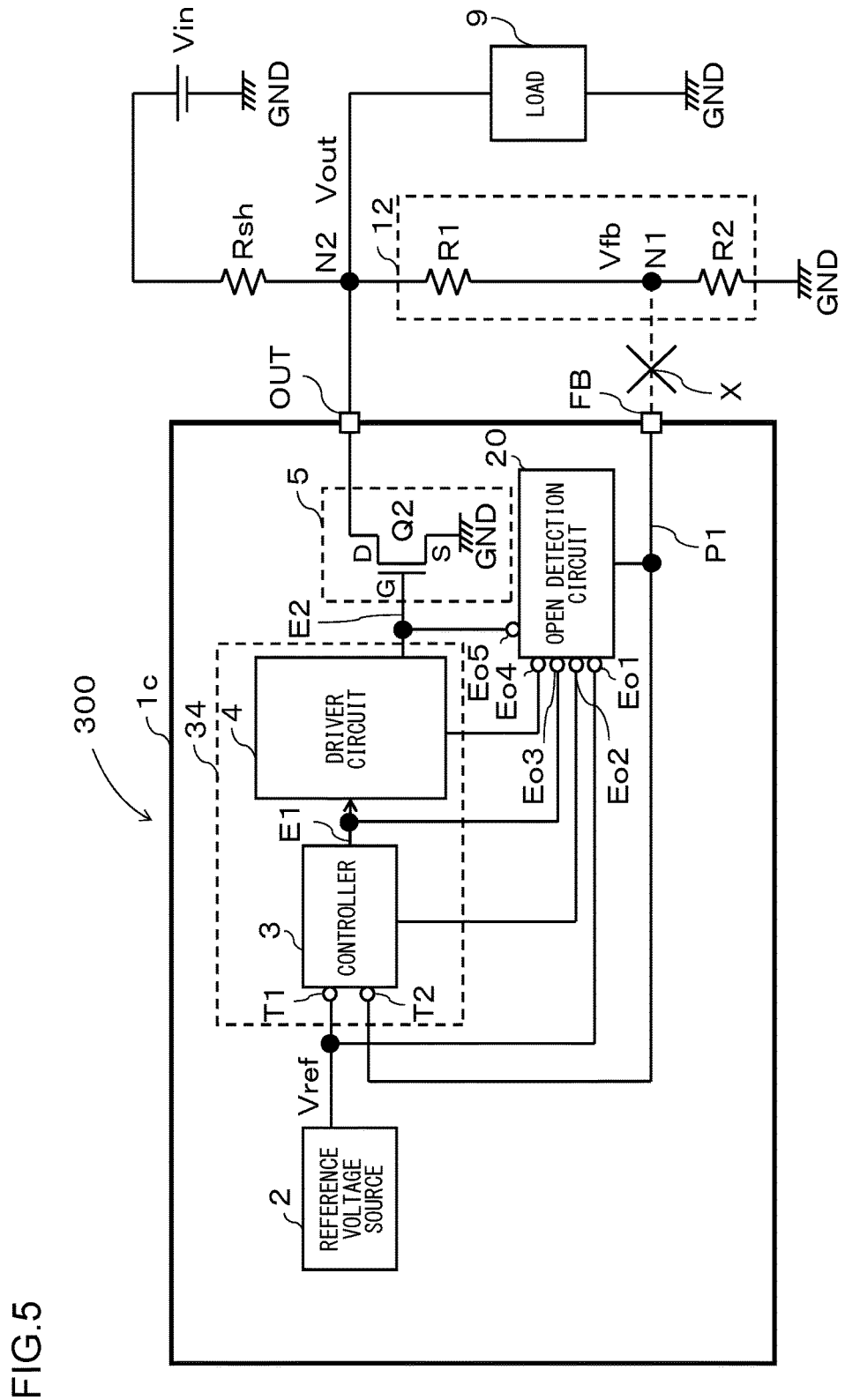
FIG. 5 is a block diagram of a power regulator according to a third embodiment of the present invention.

FIG. 5 is a block diagram of a power regulator according to a third embodiment of the present invention. The power regulator 300 shown in FIG. 5 according to the third embodiment of the present invention is a shunt regulator, which is a type of linear regulator. Now, the third embodiment of the present invention will be described with reference to the relevant drawings.

The power regulator 300 shown in FIG. 5 according to the third embodiment of the present invention shares the feature of being a linear regulator with the power regulator 200 shown in FIGS. 3 and 4 according to the second embodiment of the present invention. However, the power regulator 300 shown in FIG. 5 according to the third embodiment of the present invention is a shunt regulator, whereas the power regulator 200 shown in FIGS. 3 and 4 according to the second embodiment of the present invention is a series regulator. Accordingly, a difference lies in how the control device in the output stage 5 is connected. Other differences lie in the number of output terminals of the open detection circuit and where they are connected. Specifically, in the power regulator 200 shown in FIGS. 3 and 4, which is a series regulator, the PMOS transistor Q1 in the output stage 5 connected between the input terminal IN and the output terminal OUT is connected in series with the load 9. In contrast, in the power regulator 300 shown in FIG. 5 according to the third embodiment of the present invention, which is a shunt regulator, a control device Q2 in the output stage 5 is connected in parallel with the load 9. In the power regulator 300 shown in FIG. 5, unlike the power regulators shown in FIGS. 1 to 4, there is no need to provide an integrated circuit device 1c with an input terminal IN. Although an NMOS transistor is used as the control device Q2 in the output stage 5 in FIG. 5, this is not meant as any limitation: the control device Q2 may be a PMOS transistor, or may be a bipolar transistor. In the power regulator 300 shown in FIG. 5 according to the third embodiment of the present invention, the reference voltage Vref generated by the reference voltage source 2 also is controlled.

In FIG. 5, an integrated circuit device 1c constituting the power regulator 300 includes a reference voltage source 2, a control circuit 34, an output stage 5, an open detection circuit 20, an output terminal OUT, and a feedback terminal FB. The integrated circuit device 1c is configured as, for example, a semiconductor integrated circuit device. The integrated circuit device 1c is provided with, in addition to the output terminal OUT and the feedback terminal FB, other external terminals, which are unillustrated. The control circuit 34 includes a controller 3 and a driver circuit 4.

An output terminal of the reference voltage source 2 is connected to a first input terminal T1 of the controller 3 in the control circuit 34. The reference voltage source 2 generates a reference voltage Vref. The reference voltage source 2 is configured as, for example, a bandgap voltage circuit. The reference voltage Vref is, for example, from 1 V to 5 V.

A second input terminal T2 of the controller 3 in the control circuit 34 is connected to the feedback terminal FB of the integrated circuit device 1c across a conductor P1. An output terminal of the controller 3 is connected to an input terminal of the driver circuit 4. The controller 3 compares the reference voltage Vref of the reference voltage source 2 with a feedback voltage fed in via the feedback terminal FB, and outputs a control voltage E1 which is commensurate with the result of the comparison. As the controller 3, for example, an error amplifier configured with an operational amplifier is used. The controller 3 includes, for example, a phase compensation circuit, various protection circuits, etc., of which none are illustrated. The various protection circuits include, for example, a temperature protection circuit and an overvoltage protection circuit.

The driver circuit 4 is used to drive the output stage 5. The driver circuit 4 operates based on the control voltage E1 from the controller 3, and outputs a drive voltage E2. An output terminal of the driver circuit 4 is connected to a gate G of a control device Q2 in the output stage 5.

A drain D of the control device Q2 in the output stage 5 is connected to the output terminal OUT of the integrated circuit device 1c. A source S of the control device Q2 is connected to a ground terminal (low-potential terminal) GND. The control device Q2 operates based on the drive voltage E2 from the driver circuit 4. The control device Q2 generates an output voltage Vout from an input voltage Vin, and feeds the output voltage Vout to the output terminal OUT of the integrated circuit device 1c. The integrated circuit device 1c is of a step-down type, and the output voltage Vout is lower than the input voltage Vin. The input voltage Vin is, for example, from 2.5 V to 100 V. The output voltage Vout is, for example, from 0.6 V to 40 V.

The output terminal OUT is connected to a node N2. To the output terminal OUT, a load 9 is connected via the node N2. The load 9 is, for example, a CPU, MPU, sensor, motor, or the like. To the node N2, the input voltage Vin is applied via a shunt resistor Rsh. The current that passes through the output stage 5 or the load 9 passes through the shunt resistor Rsh. When no current is passing through the load 9, a current passes through the control device Q2 in the output stage 5, and this keeps the output voltage Vout at the output terminal OUT constant.

Between the node N2 and a node N1, a resistor R1 is connected. Between the node N1 and a ground terminal (low-potential terminal) GND, a resistor R2 is connected. The resistors R1 and R2 constitute a voltage division circuit 12. The node N1 is connected to the feedback terminal FB of the integrated circuit device 1c. The output voltage Vout is divided by the resistors R1 and R2. Thus, a feedback voltage Vfb appears at the node N1, and the feedback voltage Vfb is fed to the feedback terminal FB. The resistors R1 and R2 are each, for example, from several kilohms to several megohms.

An input terminal of the open detection circuit 20 is connected to the feedback terminal FB. The open detection circuit 20 is provided with five output terminals, namely a first to a fifth output terminal Eo1 to Eo5. The first output terminal Eo1 is connected to the output terminal of the reference voltage source 2. The second output terminal Eo2 is connected to the controller 3. The third output terminal Eo3 is connected to the output terminal of the controller 3. The fourth output terminal Eo4 is connected to the driver circuit 4. The fifth output terminal Eo5 is connected to the output terminal of the driver circuit 4. Although the open detection circuit 20 in the power regulator 300 shown in FIG. 5 is provided with five output terminals, namely the first to fifth output terminals Eo1 to Eo5, not all of these output terminals need to be provided: at least one of the first to fifth output terminals Eo1 to Eo5 has only to be provided.

In the power regulator 300 shown in FIG. 5 according to the third embodiment of the present invention, as in the power regulator 100 shown in FIG. 1 according to the first embodiment, during normal operation, the controller 3, the driver circuit 4, and the output stage 5 are controlled so as to keep the output voltage Vout constant, and the open detection circuit 20 does not operate.

On the other hand, when the feedback terminal FB is detected being in an open state, the open detection circuit 20 turns the reference voltage Vref output from the reference voltage source 2 to 0 V or a potential close to 0 V. The open detection circuit 20 also stops the operation of the controller 3 and the driver circuit 4. Moreover, to turn off, for example, the PMOS and NMOS transistors, etc. in the output stage 5, the open detection circuit 20 connects the signal path between the controller 3 and the driver circuit 4 to the power terminal (high-potential terminal) or the ground terminal (low-potential terminal) to hold the control voltage E1 at HIGH or LOW level. Likewise, the open detection circuit 20 holds the drive voltage E2 at HIGH or LOW level. That is, the control voltage E1 and the drive voltage E2 are held at the levels that keep the output stage 5 OFF. As a result, the operation of the output stage 5 is stopped and the output stage 5 ceases to output the output voltage Vout. In this way, the load 9 connected to the output terminal OUT is prevented from deterioration and destruction.

Fourth Embodiment

Figure 6:
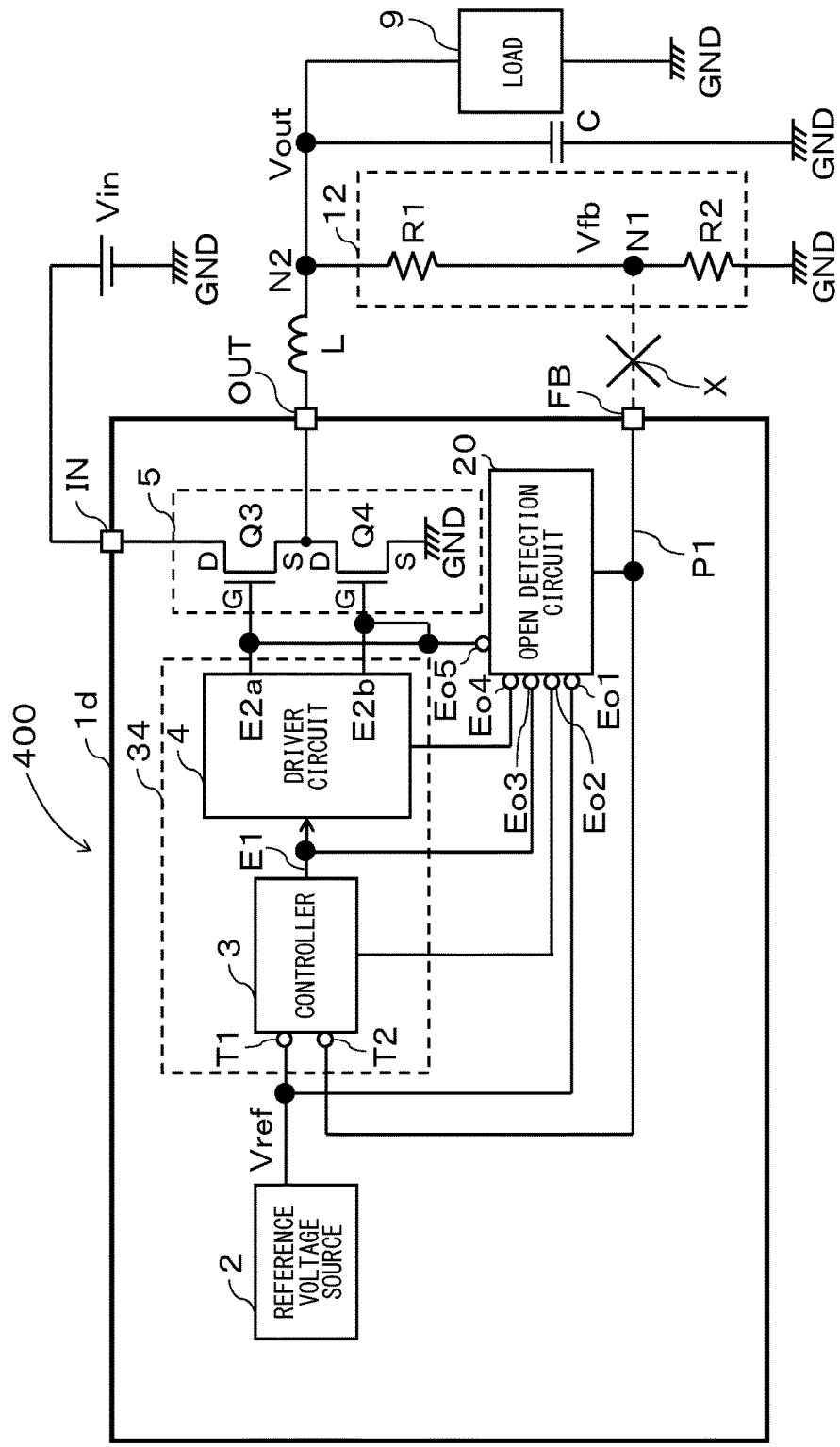
FIG. 6 is a block diagram of a power regulator according to a fourth embodiment of the present invention.

FIG. 6 is a block diagram of a power regulator according to a fourth embodiment of the present invention. The power regulator 400 shown in FIG. 6 according to the fourth embodiment of the present invention is a step-down synchronous-rectification DC/DC converter, which is a type of switching regulator. Now, the fourth embodiment of the present invention will be described with reference to the relevant drawings.

A difference between the power regulator 400 shown in FIG. 6 according to the fourth embodiment of the present invention and the power regulators shown in FIGS. 1 to 5 lies in whether they are a switching regulator or a linear regulator. The power regulator 400 shown in FIG. 6, which is a switching regulator, includes a smoothing circuit composed of an inductor L and a capacitor C. Moreover, the driver circuit 4 in the power regulator 400 shown in FIG. 6, unlike the driver circuit 4 in the power regulators shown in FIGS. 1 to 5, has a first output terminal and a second output terminal. The output stage 5 is composed of two transistors, namely a switching transistor Q3 and a synchronous rectification transistor Q4. The open detection circuit 20 has a first to a fifth output terminal Eo1 to Eo5. In the power regulator 400 shown in FIG. 6 according to the fourth embodiment of the present invention, the reference voltage Vref generated by the reference voltage source 2 also is controlled.

In FIG. 6, an integrated circuit device 1d constituting the power regulator 400 includes a reference voltage source 2, a control circuit 34, an output stage 5, an open detection circuit 20, an input terminal IN, an output terminal OUT, and a feedback terminal FB. The integrated circuit device 1d is configured as, for example, a semiconductor integrated circuit device. The integrated circuit device 1d is provided with, in addition to the input terminal, the output terminal OUT, and the feedback terminal FB, other external terminals, which are unillustrated. The control circuit 34 includes a controller 3 and a driver circuit 4.

An output terminal of the reference voltage source 2 is connected to a first input terminal T1 of the controller 3 in the control circuit 34. The reference voltage source 2 generates a reference voltage Vref. The reference voltage source 2 is configured as, for example, a bandgap voltage circuit. The reference voltage Vref is, for example, from 1 V to 5 V.

A second input terminal T2 of the controller 3 in the control circuit 34 is connected to the feedback terminal FB of the integrated circuit device 1d across a conductor P1. An output terminal of the controller 3 is connected to an input terminal of the driver circuit 4. The controller 3 compares the reference voltage Vref of the reference voltage source 2 with a feedback voltage fed in via the feedback terminal FB, and outputs a control voltage E1 which is commensurate with the result of the comparison. As the controller 3, for example, an error amplifier configured with an operational amplifier is used. The controller 3 includes, for example, a phase compensation circuit, various protection circuits, etc., of which none are illustrated. The various protection circuits include, for example, a temperature protection circuit and an overvoltage protection circuit.

The driver circuit 4 is used to drive the output stage 5. A first output terminal of the driver circuit 4 is connected to a gate G of a switching transistor Q3 in the output stage 5. A second output terminal of the driver circuit 4 is connected to a gate G of a synchronous-rectification transistor Q4 in the output stage 5.

A drain D of the switching transistor Q3 in the output stage 5 is connected to the input terminal IN of the integrated circuit device 1d. To the input terminal IN, an input voltage Vin is applied. A source S of the switching transistor Q3 is connected to a drain D of the synchronous-rectification transistor Q4. A source S of the synchronous-rectification transistor Q4 is connected to a ground terminal (low-potential terminal) GND. Thus, the switching transistor Q3 and the synchronous-rectification transistor Q4 in the output stage 5 are connected in series between the input terminal IN and the ground terminal (low-potential terminal) GND. The output terminal OUT of the integrated circuit device 1d is connected to the common node between the switching transistor Q3 and the synchronous-rectification transistor Q4. The switching transistor Q3 and the synchronous-rectification transistor Q4 in the output stage 5 are driven complementarily by drive voltages E2a and E2b from the driver circuit 4, and generate an output voltage Vout from the input voltage Vin fed in via the input terminal IN to feed the output voltage Vout to the output terminal OUT. The integrated circuit device 1d is of a step-down type, and the output voltage Vout is lower than the input voltage Vin. The input voltage Vin is, for example, from 2.5 V to 100 V. The output voltage Vout is, for example, from 0.6 V to 40 V.

Here, "complementarily" covers not only operation where the ON and OFF states of the switching transistor Q3 and the synchronous-rectification transistor Q4 are completely reversed but also operation where, with a view to preventing a through current, a predetermined delay, that is, a dead time, is provided in the ON-OFF transition timing of the switching transistor Q3 and the synchronous-rectification transistor Q4.

Although here the switching transistor Q3 and the synchronous-rectification transistor Q4 are both assumed to be NMOS transistors (N-channel metal-oxide-semiconductor field-effect transistors), the switching transistor Q3 may instead be a PMOS transistor (P-channel metal-oxide-semiconductor field-effect transistor) while the synchronous-rectification transistor Q4 is an NMOS transistor. In a case where an NMOS transistor is used as the switching transistor Q3, a bootstrap circuit is used that includes a diode and a capacitor, of which neither is illustrated. The bootstrap circuit permits the switching transistor Q3 to turn ON reliably. As the switching transistor Q3 and the synchronous-rectification transistor Q4, instead of MOS transistors, bipolar transistors may be used.

The inductor L is connected between the output terminal OUT of the integrated circuit device 1d and a node N2. The capacitor C is connected between the node N2 and the ground terminal (low-potential terminal) GND. The inductor L and the capacitor C constitute a smoothing circuit.

The resistor R1 is connected between the node N2 and a node N1. The resistor R2 is connected between the node N1 and the ground terminal (low-potential terminal) GND. The resistors R1 and R2 constitute a voltage division circuit 12. The node N1 is connected to the feedback terminal FB of the integrated circuit device 1d. The output voltage Vout is divided by the resistors R1 and R2. Thus, a feedback voltage Vfb appears at the node N1, and the feedback voltage Vfb is fed to the feedback terminal FB. The resistors R1 and R2 are each, for example, from several kilohms to several megohms.

To the output terminal OUT, a load 9 is connected via the node N2. The load 9 is, for example, a CPU, MPU, sensor, motor, or the like.

An input terminal of the open detection circuit 20 is connected to the feedback terminal FB. The open detection circuit 20 is provided with five output terminals, namely a first to a fifth output terminal Eo1 to Eo5. The first output terminal Eo1 is connected to the output terminal of the reference voltage source 2. The second output terminal Eo2 is connected to the controller 3. The third output terminal Eo3 is connected to the output terminal of the controller 3. The fourth output terminal Eo4 is connected to the driver circuit 4. The fifth output terminal Eo5 is connected to the first and second output terminals of the driver circuit 4. Although the open detection circuit 20 in the power regulator 400 shown in FIG. 6 is provided with five output terminals, namely the first to fifth output terminals Eo1 to Eo5, not all of these output terminals need to be provided: at least one of the first to fifth output terminals Eo1 to Eo5 has only to be provided.

In the power regulator 400 shown in FIG. 6 according to the fourth embodiment of the present invention, as in the power regulator 100 shown in FIG. 1 according to the first embodiment, during normal operation, the controller 3, the driver circuit 4, and the output stage 5 are controlled so as to keep the output voltage Vout constant, and the open detection circuit 20 does not operate.

On the other hand, when the feedback terminal FB is detected being in an open state, the open detection circuit 20 turns the reference voltage Vref output from the reference voltage source 2 to 0 V or a potential close to 0 V. The open detection circuit 20 also stops the operation of the controller 3 and the driver circuit 4. Moreover, to turn off, for example, the PMOS and NMOS transistors, etc. in the output stage 5, the open detection circuit 20 connects the signal path between the controller 3 and the driver circuit 4 to the power terminal (high-potential terminal) or the ground terminal (low-potential terminal) to hold the control voltage E1 at HIGH or LOW level. Likewise, the open detection circuit 20 holds each of the drive voltages E2a and E2b at HIGH or LOW level. That is, the control voltage E1 and the drive voltages E2a and E2b are held at the levels that keep the output stage 5 OFF. As a result, the operation of the output stage 5 is stopped and the output stage 5 ceases to output the output voltage Vout. In this way, the load 9 connected to the output terminal OUT is prevented from deterioration and destruction.

Fifth Embodiment

Figure 7:
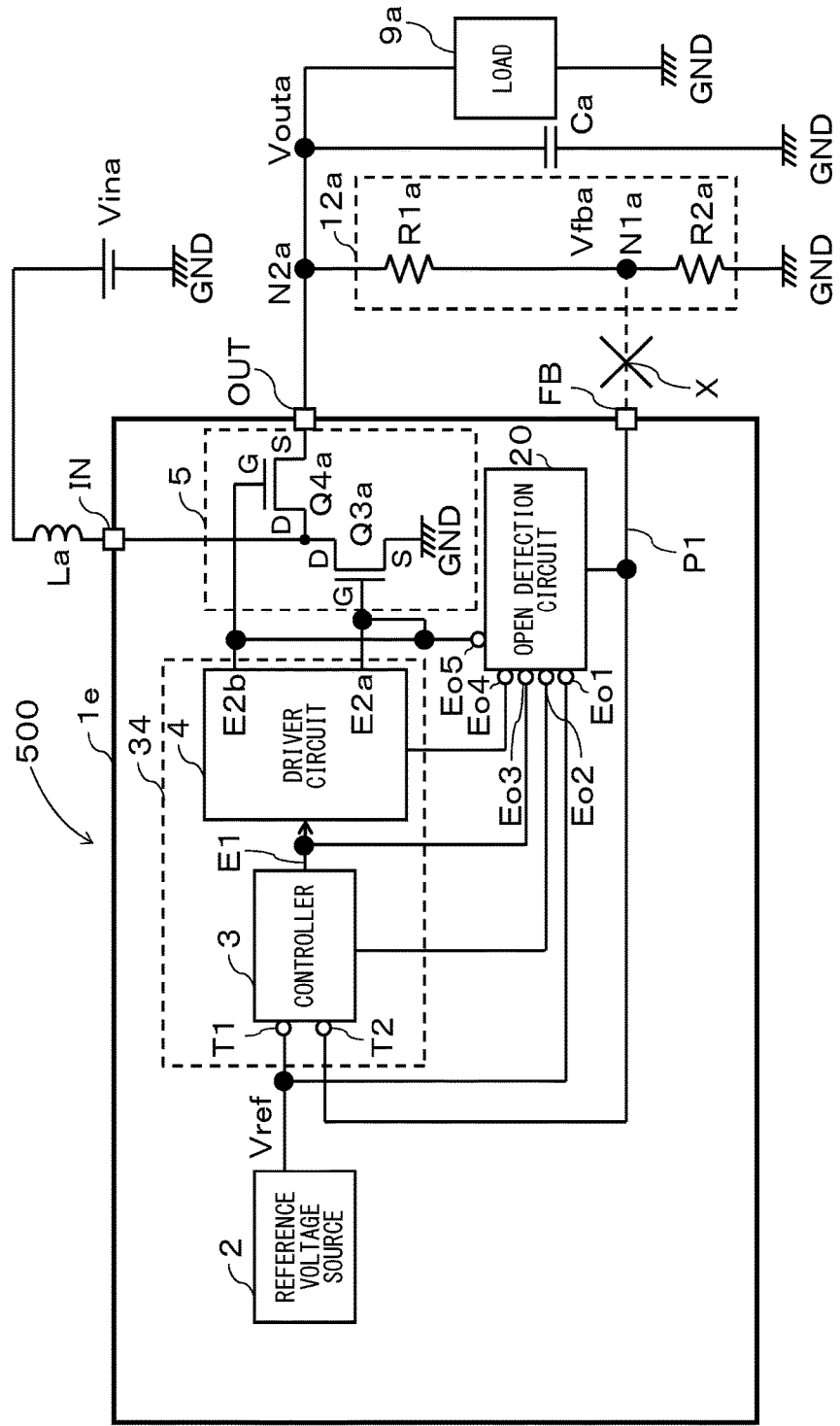
FIG. 7 is a block diagram of a power regulator according to a fifth embodiment of the present invention.

FIG. 7 is a block diagram of a power regulator according to a fifth embodiment of the present invention. The power regulator 500 shown in FIG. 7 according to the fifth embodiment of the present invention is a step-up synchronous-rectification DC/DC converter, which is a type of switching regulator. Now, the fifth embodiment of the present invention will be described with reference to the relevant drawings.

A difference between the power regulator 500 shown in FIG. 7 according to the fifth embodiment of the present invention and the power regulator 400 shown in FIG. 6 lies in whether they are of a step-up or step-down type. Accordingly, the two transistors in the output stage 5, namely the switching transistor Q3 and the synchronous-rectification transistor Q4, are connected differently.

In FIG. 7, an integrated circuit device 1e constituting the power regulator 500 includes a reference voltage source 2, a control circuit 34, an output stage 5, an open detection circuit 20, an input terminal IN, an output terminal OUT, and a feedback terminal FB. The integrated circuit device 1e is configured as, for example, a semiconductor integrated circuit device. The integrated circuit device 1e is provided with, in addition to the input terminal IN, the output terminal OUT, and the feedback terminal FB, other external terminals, which are unillustrated. The control circuit 34 includes a controller 3 and a driver circuit 4.

An output terminal of the reference voltage source 2 is connected to a first input terminal T1 of the controller 3 in the control circuit 34. The reference voltage source 2 generates a reference voltage Vref. The reference voltage source 2 is configured as, for example, a bandgap voltage circuit. The reference voltage Vref is, for example, from 1 V to 5 V.

A second input terminal T2 of the controller 3 in the control circuit 34 is connected to the feedback terminal FB of the integrated circuit device 1e across a conductor P1. An output terminal of the controller 3 is connected to an input terminal of the driver circuit 4. The controller 3 compares the reference voltage Vref of the reference voltage source 2 with a feedback voltage fed in via the feedback terminal FB, and outputs a control voltage E1 which is commensurate with the result of the comparison. As the controller 3, for example, an error amplifier configured with an operational amplifier is used. The controller 3 includes, for example, a phase compensation circuit, various protection circuits, etc., of which none are illustrated. The various protection circuits include, for example, a temperature protection circuit and an overvoltage protection circuit.

The driver circuit 4 is used to drive the output stage 5. A first output terminal of the driver circuit 4 is connected to a gate G of a synchronous-rectification transistor Q4a in the output stage 5. On the other hand, a second output terminal of the driver circuit 4 is connected to a gate G of a switching transistor Q3a in the output stage 5.

A source S of the switching transistor Q3a is connected to a ground terminal (low-potential terminal) GND. A drain D of the switching transistor Q3a is connected to the input terminal IN of the integrated circuit device 1e. To the input terminal IN, an input voltage Vina is applied via an inductor La. A drain D of the switching transistor Q3a is connected to the input terminal IN of the integrated circuit device 1e. A source S of the synchronous-rectification transistor Q4a is connected to the output terminal OUT of the integrated circuit device 1e. The switching transistor Q3a and the synchronous-rectification transistor Q4a in the output stage 5 are driven complementarily by drive voltages E2a and E2b from the driver circuit 4, and generate an output voltage Vouta from the input voltage Vina fed in via the input terminal IN to feed the output voltage Vouta to the output terminal OUT. The integrated circuit device 1e is of a step-up type, and the output voltage Vouta is higher than the input voltage Vina. The input voltage Vina is, for example, from 0.6 V to 40 V. The output voltage Vouta is, for example, from 2.5 V to 100 V.

Here, "complementarily" covers not only operation where the ON and OFF states of the switching transistor Q3a and the synchronous-rectification transistor Q4a are completely reversed but also operation where, with a view to preventing a through current, a predetermined delay, that is, a dead time, is provided in the ON-OFF transition timing of the switching transistor Q3a and the synchronous-rectification transistor Q4a.

Although here the switching transistor Q3a and the synchronous-rectification transistor Q4a are both assumed to be NMOS transistors (N-channel metal-oxide-semiconductor field-effect transistors), the synchronous-rectification transistor Q4a may instead be a PMOS transistor (P-channel metal-oxide-semiconductor field-effect transistors) while the switching transistor Q3a is an NMOS transistor. In a case where an NMOS transistor is used as the synchronous-rectification transistor Q4a, a bootstrap circuit is used that includes a diode and a capacitor, of which neither is illustrated. The bootstrap circuit permits the synchronous-rectification transistor Q4a to turn ON reliably. As the switching transistor Q3a and the synchronous-rectification transistor Q4a, instead of MOS transistors, bipolar transistors may be used.

A capacitor Ca is connected between a node N2a and the ground terminal (low-potential terminal) GND.

A resistor R1a is connected between the node N2a and a node N1a. A resistor R2a is connected between the node N1a and the ground terminal (low-potential terminal) GND. The resistors R1a and R2a constitute a voltage division circuit 12a. The node N1a is connected to the feedback terminal FB of the integrated circuit device 1e. The output voltage Vouta is divided by the resistors R1a and R2a. Thus, a feedback voltage Vfba appears at the node N1a, and the feedback voltage Vfba is fed to the feedback terminal FB. The resistors R1a and R2a are each, for example, from several kilohms to several megohms.

To the output terminal OUT, a load 9a is connected via the node N2a. The load 9a is, for example, an LED, motor, or the like.

An input terminal of the open detection circuit 20 is connected to the feedback terminal FB. The open detection circuit 20 is provided with five output terminals, namely a first to a fifth output terminal Eo1 to Eo5. The first output terminal Eo1 is connected to the output terminal of the reference voltage source 2. The second output terminal Eo2 is connected to the controller 3. The third output terminal Eo3 is connected to the output terminal of the controller 3. The fourth output terminal Eo4 is connected to the driver circuit 4. The fifth output terminal Eo5 is connected to the output terminal of the driver circuit 4. Although the open detection circuit 20 in the power regulator 500 shown in FIG. 7 is provided with five output terminals, namely the first to fifth output terminals Eo1 to Eo5, not all of these output terminals need to be provided: at least one of the first to fifth output terminals Eo1 to Eo5 has only to be provided.

In the power regulator 500 shown in FIG. 7 according to the fifth embodiment of the present invention, as in the power regulator 100 shown in FIG. 1 according to the first embodiment, during normal operation, the controller 3, the driver circuit 4, and the output stage 5 are controlled so as to keep the output voltage Vouta constant, and the open detection circuit 20 does not operate.

On the other hand, when the feedback terminal FB is detected being in an open state, the open detection circuit 20 turns the reference voltage Vref output from the reference voltage source 2 to 0 V or a potential close to 0 V. The open detection circuit 20 also stops the operation of the controller 3 and the driver circuit 4. Moreover, to turn off, for example, the PMOS and NMOS transistors, etc. in the output stage 5, the open detection circuit 20 connects the signal path between the controller 3 and the driver circuit 4 to the power terminal (high-potential terminal) or the ground terminal (low-potential terminal) to hold the control voltage E1 at HIGH or LOW level. Likewise, the open detection circuit 20 holds each of the drive voltages E2a and E2b at HIGH or LOW level. That is, the control voltage E1 and the drive voltages E2a and E2b are held at the levels that keep the output stage 5 OFF. As a result, the operation of the output stage 5 is stopped and the output stage 5 ceases to output the output voltage Vouta. In this way, the load 9 connected to the output terminal OUT is prevented from deterioration and destruction.

Sixth Embodiment

Figure 8:
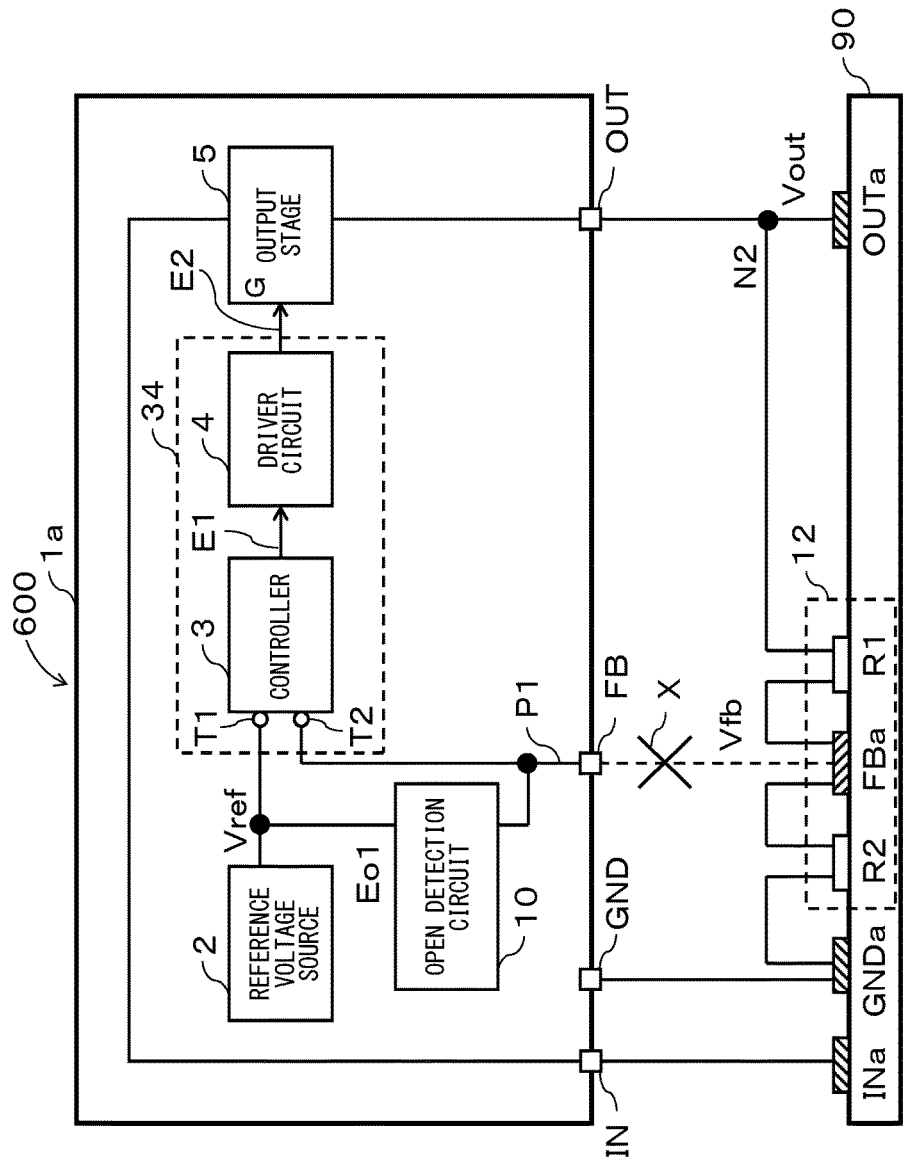
FIG. 8 is a configuration diagram (corresponding to the sixth embodiment of the present invention) of a power regulator device employing the power regulator shown in FIG. 1 according to the first embodiment of the present invention.

FIG. 8 is a schematic structure diagram (corresponding to a sixth embodiment of the present invention) of a power regulator device 600 in which the power regulator 100 according to the first embodiment of the present invention is mounted on a circuit board. The power regulator device 600 in FIG. 8 is a linear regulator. Now, the sixth embodiment of the present invention will be described with reference to the relevant drawings.

In FIG. 8, the input terminal IN of the integrated circuit device 1a is connected to an input terminal INa of a circuit board 90. The output terminal OUT of the integrated circuit device 1a is connected to an output terminal OUTa of the circuit board 90. The ground terminal (low-potential terminal) GND of the integrated circuit device 1a is connected to a ground terminal (low-potential terminal) GNDa of the circuit board 90. The feedback terminal FB of the integrated circuit device 1a is connected to a feedback terminal FBa of the circuit board 90. However, in FIG. 8, it is assumed that a disconnection (a broken wire or the like) X cuts off conduction between the feedback terminal FB of the integrated circuit device 1a and the feedback terminal FBa of the circuit board 90.

The resistor R1, which is mounted on the circuit board 90, is connected between the output terminal OUTa (corresponding to the node N2) of the circuit board 90 and the feedback terminal FBa of the circuit board 90. The resistor R2, which is mounted on the circuit board 90, is connected between the feedback terminal FBa of the circuit board 90 and the ground terminal (low-potential terminal) GNDa of the circuit board 90. The resistors R1 and R2 constitute the voltage division circuit 12.

In FIG. 8, due to an error in mounting the feedback terminal FB, an error in mounting the resistor R1 as an externally fitted resistor, an error in mounting the resistor R2 as an externally fitted resistor, or any other inadvertent accident or the like, a disconnection (a broken wire or the like) X can occur, leaving open the path between the feedback terminal FB of the integrated circuit device 1a and the feedback terminal FBa of the circuit board 90. When this happens, the open detection circuit 10 in the integrated circuit device 1a detects the feedback terminal FB of the integrated circuit device 1a being open due to the disconnection X between the feedback terminal FB of the integrated circuit device 1a and the feedback terminal FBa of the circuit board 90, and turns the reference voltage Vref output from the reference voltage source 2 to 0 V. As a result, the controller 3, the driver circuit 4, and the output stage 5 are so driven as to turn the output voltage Vout to 0 V or a level close to it.

The DC/DC converters according to the third and fourth embodiments of the present invention can be applied to step-up/down DC/DC converters that can operate as both step-up and step-down converters.

In a power regulator, a feedback terminal left open greatly influences the setting of the output voltage at an output terminal. Moreover, to the feedback terminal, at least two externally fitted resistors are connected, and in addition those resistors each have two terminals; this contributes to a higher probability of the feedback terminal becoming open than other external terminals. Furthermore, a circuit of which an output voltage is fed back to a feedback terminal necessarily includes a reference voltage source, and by controlling the reference voltage, it is comparatively easy to control the output voltage. Out of these considerations, in all of the power regulators according to the first to fifth embodiments, owing to the provision of the open detection circuit, the output of the power regulator is almost fully shut off when the feedback terminal lapses into an open state due to an error in mounting the feedback terminal FB, an error in mounting an externally fitted resistor, or any other inadvertent terminal-opening accident or the like. The power regulator then ceases to output the output voltage, and thus the load connected to the output terminal is prevented from deterioration and destruction.

Power regulators according to the present invention can be applied to both linear regulators and switching regulators, and to any of step-down, step-up, and step-up/down regulators. Seeing that a negative feedback circuit necessarily includes a feedback terminal and necessarily compares a feedback voltage fed to the feedback terminal with a reference voltage, power regulators according to the present invention can be applied to any circuits in general that include a negative feedback circuit. Thus, the application of the present invention is not limited to power regulators.

Correspondence Between Components in the First to Sixth Embodiments and Claimed Elements In the first embodiment, the bipolar transistor Q11 corresponds to a PNP transistor; the PMOS transistor Q12 corresponds to a first PMOS transistor; the PMOS transistor Q13 corresponds to a second PMOS transistor; the NMOS transistor Q14 corresponds to an NMOS transistor; the resistor R11 corresponds to a first resistor; the resistor R12 corresponds to a second resistor; the resistor R13 corresponds to a third resistor. In the fourth embodiment, the switching transistor Q3 corresponds to a transistor. In the fifth embodiment, the synchronous-rectification transistor Q4a corresponds to a transistor.

Seventh Embodiment

Figure 9:
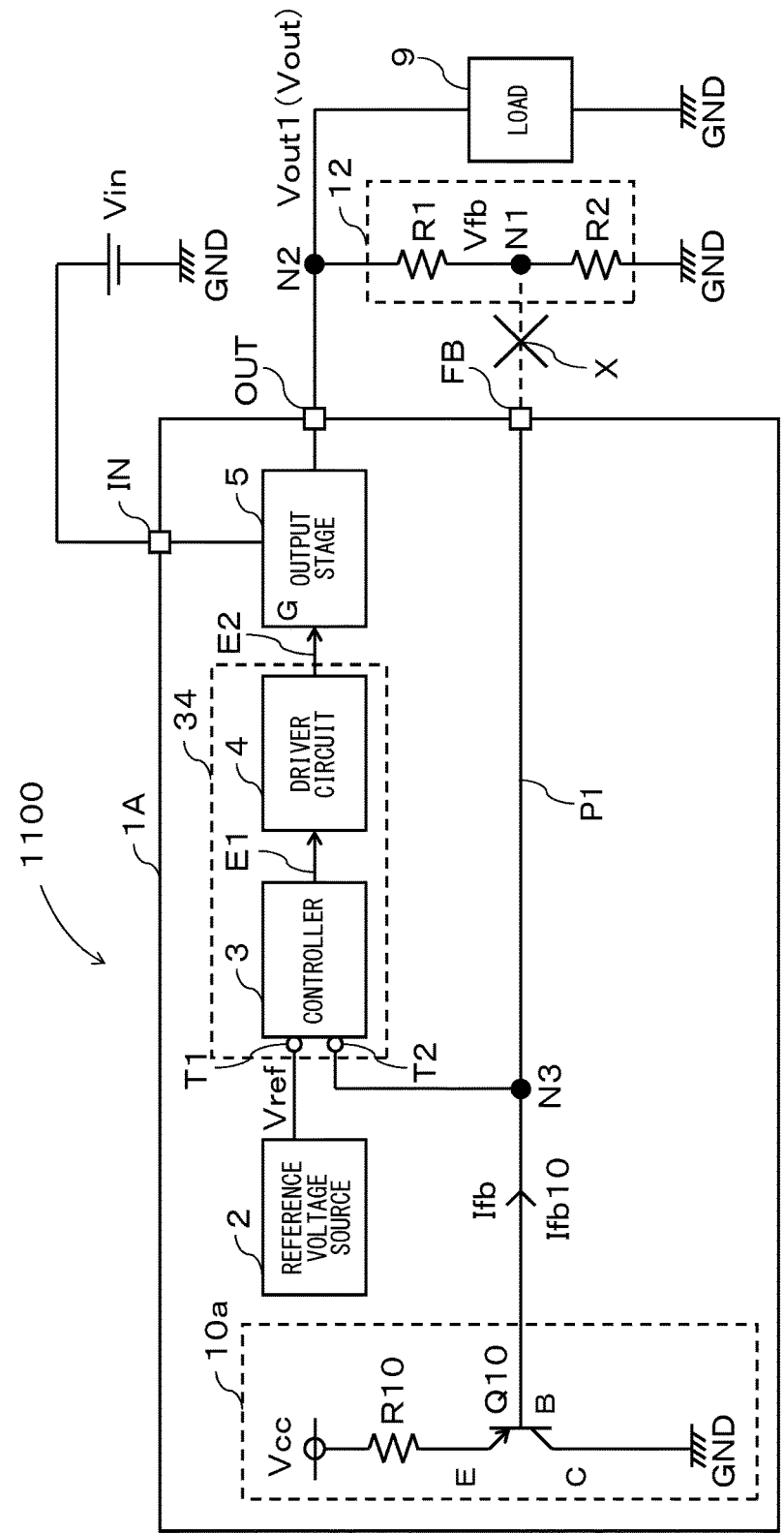
FIG. 9 is a block diagram of a power regulator according to a seventh embodiment of the present invention.

FIG. 9 is a block diagram of a power regulator according to a seventh embodiment of the present invention. Now, the seventh embodiment of the present invention will be described with reference to the relevant drawings. Components having the same function are identified by the same reference sign, and no overlapping description will be repeated.

Figure 13:
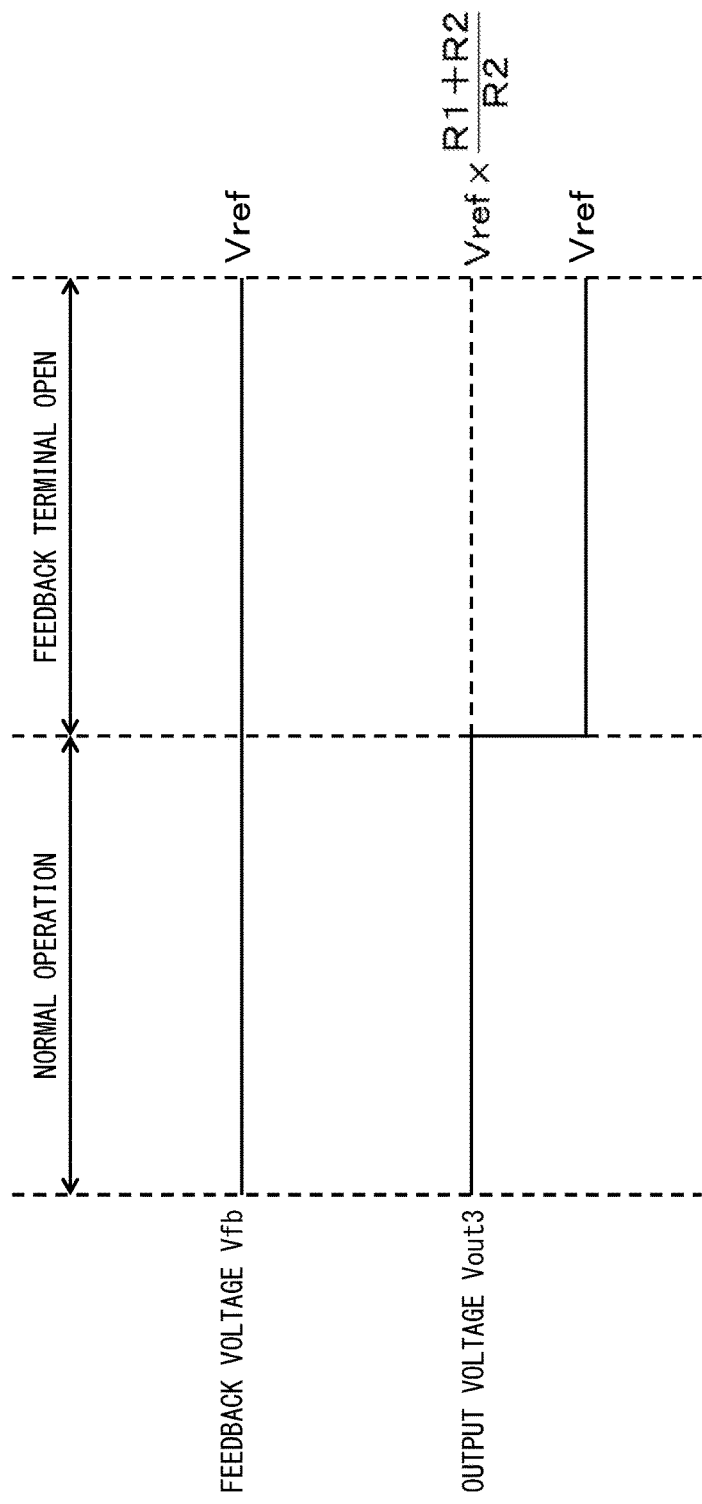
FIG. 13 is a schematic diagram showing relevant potentials observed when the power regulator shown in FIG. 12 is operating normally and when the feedback terminal is open.

A difference between the power regulator 1100 shown in FIG. 9 according to the seventh embodiment of the present invention and the conventional power regulator 2000 shown in FIG. 13 lies in whether they include a voltage holding circuit 10a or not.

In FIG. 9, an integrated circuit device 1A constituting the power regulator 1100 includes a reference voltage source 2, a control circuit 34, an output stage 5, a voltage holding circuit 10a, an input terminal IN, an output terminal OUT, and a feedback terminal FB. The integrated circuit device 1A is configured as, for example, a semiconductor integrated circuit device. The integrated circuit device 1A is provided with, in addition to the input terminal IN, the output terminal OUT, and the feedback terminal FB, other external terminals, which are unillustrated. The control circuit 34 includes a controller 3 and a driver circuit 4.

An output terminal of the reference voltage source 2 is connected to a first input terminal T1 of the controller 3 in the control circuit 34. The reference voltage source 2 generates a reference voltage Vref. The reference voltage source 2 is configured as, for example, a bandgap voltage circuit. The reference voltage Vref is, for example, from 1 V to 5 V.

A second input terminal T2 of the controller 3 in the control circuit 34 is connected to the feedback terminal FB of the integrated circuit device 1A via a node N3 across a conductor P1. An output terminal of the controller 3 is connected to an input terminal of the driver circuit 4. The controller 3 compares the reference voltage Vref of the reference voltage source 2 with a feedback voltage fed in via the feedback terminal FB, and outputs a control voltage E1 which is commensurate with the result of the comparison. As the controller 3, for example, an error amplifier configured with an operational amplifier is used. The controller 3 includes, for example, a phase compensation circuit, various protection circuits, etc., of which none are illustrated. The various protection circuits include, for example, a temperature protection circuit and an overvoltage protection circuit.

The driver circuit 4 is used to drive the output stage 5. An output terminal of the driver circuit 4 is connected to a gate G of a MOSFET, unillustrated, in the output stage 5. The driver circuit 4 operates based on the control voltage E1 from the controller 3, and outputs a drive voltage E2.

An input terminal of the output stage 5 is connected to the input terminal IN of the integrated circuit device 1A. To the input terminal IN, an input voltage Vin is applied. An output terminal of the output stage 5 is connected to the output terminal OUT of the integrated circuit device 1A. The output stage 5 is driven based on the drive voltage E2 from the driver circuit 4. The output stage 5 generates an output voltage Vout1 from the input voltage Vin fed in via the input terminal IN, and feeds the output voltage Vout1 to the output terminal OUT of the integrated circuit device 1A. Incidentally, in a case where the output stage 5 can operate normally even with the voltage difference between the input terminal IN and the output terminal OUT, for example, less than 1 V, this is particularly called an LDO (low-dropout) power supply. The power regulator 1100 according to the seventh embodiment of the present invention is applicable to linear regulators in general including LDO power supplies. The input voltage Vin is, for example, from 2.5 V to 100 V. The output voltage Vout1 is, for example, from 0.6 V to 40 V.

The output terminal OUT is connected to a node N2. Between the node N2 and a node N1, a resistor R1 is connected. Between the node N1 and a ground terminal (low-potential terminal) GND, a resistor R2 is connected. The resistors R1 and R2 constitute a voltage division circuit 12. The node N1 is connected to the feedback terminal FB of the integrated circuit device 1A. The output voltage Vout1 is divided by the resistors R1 and R2, which are resistors external to the integrated circuit device 1A. Thus, a feedback voltage Vfb appears at the node N1, and the feedback voltage Vfb is fed to the feedback terminal FB. The resistors R1 and R2 are each, for example, from several kilohms to several megohms.

To the output terminal OUT, a load 9 is connected via the node N2. The load 9 is, for example, a CPU, MPU, sensor, motor, or the like.

The voltage holding circuit 10a includes a PNP transistor Q10 and a resistor R10. A collector C of the PNP transistor Q10 in the voltage holding circuit 10a is connected to the ground terminal (low-potential terminal) GND. The resistor R10 is connected between an emitter E of the PNP transistor Q10 and a power terminal (high-potential terminal) Vcc. A base B of the PNP transistor Q10 in the voltage holding circuit 10a is connected to the node N3. Thus, the base B of the PNP transistor Q10 is connected to the conductor P1 to which the feedback voltage Vfb is fed.

When the feedback terminal FB lapses into an open state due to a disconnection X between the node N1 and the feedback terminal FB, the voltage holding circuit 10a holds the voltage applied to the second input terminal T2 of the controller 3 at a predetermined voltage. Specifically, when the feedback terminal FB lapses into an open state, the base current Ifb of the PNP transistor Q10 substantially loses the path for it to pass through, and thus the collector current of the PNP transistor Q10 substantially ceases to pass. Thus, the emitter voltage of the PNP transistor Q10 becomes approximately equal to the voltage at the power terminal (high-potential terminal) Vcc. Here, an unillustrated parasitic resistance is present between the node N3 and an unillustrated circuit board. Thus, with the feedback terminal FB in an open state, a negligibly low base current Ifb10 passes via the emitter E and the base B of the PNP transistor Q10 and the unillustrated parasitic resistance. Thus, let the voltage at the power terminal (high-potential terminal) Vcc be Vcc, then the base voltage of the PNP transistor Q10 equals Vcc−Vf. As a result, the second input terminal T2 of the controller 3, which is at the same potential as the node N3, is no longer indefinite but is held at a predetermined voltage. Here, the predetermined voltage is a voltage with a higher value than the reference voltage Vref Thus, the controller 3, the driver circuit 4, and the output stage 5 are driven to turn the output voltage Vout1 to 0 V when the feedback terminal FB is in an open state. In this way, the load 9 connected to the output terminal OUT is prevented from deterioration and destruction. Incidentally, the unillustrated parasitic resistance includes the finite but extremely high input impedance of the controller 3 in the control circuit 34, the parasitic resistance between the base of the PNP transistor Q10 and the unillustrated circuit board, the parasitic resistance between the conductor P1 and the unillustrated circuit board, to name a few. On the other hand, an open state includes not only the state where the path between the feedback terminal FB and the voltage division circuit 12 is open but also the state where the part of the conductor P1 leading from the feedback terminal FB to the node N3 is broken. That is, a break in the part of the conductor P1 leading from the feedback terminal FB to the node N3 can be coped with equally well.

When the power regulator 1100 is operating normally, the PNP transistor Q10 is ON, and the base current Ifb passes constantly. The magnitude of the base current that passes during normal operation is given by formula (1), where Vcc represents the supply voltage at the power terminal Vcc, hFE10 represents the current amplification factor of the PNP transistor Q10, Vf represents the emitter-base forward voltage of the PNP transistor Q10, Vfb represents the feedback voltage, and r10 represents the resistance value of the resistor R10.

$$Ifb=((Vcc-Vf-Vfb)/(r10 \cdot hFE10)) \quad (1)$$

Without the voltage holding circuit 10a provided, the level of the output voltage Vout1 is given by formula (2), where Vref represents the reference voltage, r1 represents the resistance value of the resistor R1, and r2 represents the resistance value of the resistor R2.

$$Vout=((r1+r2)/r2) \cdot Vref \quad (2)$$

By contrast, with the voltage holding circuit 10a provided, 10a, the level of the output voltage Vout1 is given by formula (3), where Vref represents the reference voltage, r1 represents the resistance value of the resistor R1, r2 represents the resistance value of the resistor R2, and Ifb represents the base current that passes during normal operation.

$$Vout1=((r1+r2)/r2) \cdot Vref - r1 \cdot Ifb \quad (3)$$

Comparing formula (2) with formula (3) will reveal that, with the voltage holding circuit 10a provided, the magnitude of the base current Ifb of the PNP transistor Q10, that is, the level of the current amplification factor hFE10 of the PNP transistor Q10, exerts a larger influence than without the voltage holding circuit 10a provided. Furthermore, with the voltage holding circuit 10a provided, the output voltage Vout1 is lower, by the margin of the voltage r1·Ifb, than the output voltage Vout obtained without the voltage holding circuit 10a provided. This influence of the base current Ifb of the PNP transistor Q10 needs to be eliminated as much as possible.

Here, if it is assumed that Vcc=5 V, Vf=0.7 V, Vref=1 V, r1=80 kΩ, r2=20 kΩ, r10=5 MΩ, and hFE=100, then the base current Ifb of the PNP transistor Q10 equals 6.6 nA. Without the voltage holding circuit 10a provided, the output voltage Vout is set originally at 5 V. On the other hand, with the voltage holding circuit 10a provided, the output voltage Vout1 equals 5V−(6.6 nA·80 kΩ)=5−0.000528 V=4.9995 V. Thus, compared with the output voltage Vout obtained without the voltage holding circuit 10a provided, the output voltage Vout1 obtained with the voltage holding circuit 10a provided contains an error of about −0.01%, but an error of this order is negligible in practical terms. To make the level of the output voltage Vout1 closer to the level of the output voltage Vout, it is necessary to increase the current amplification factor hFE10 of the PNP transistor Q10, to increase the resistance value r10 of the resistor R10, and to reduce the resistance value r1 of the resistor R1. The current amplification factor hFE10 can be increased by configuring the PNP transistor Q10 in a Darlington connection.

Figure 10:
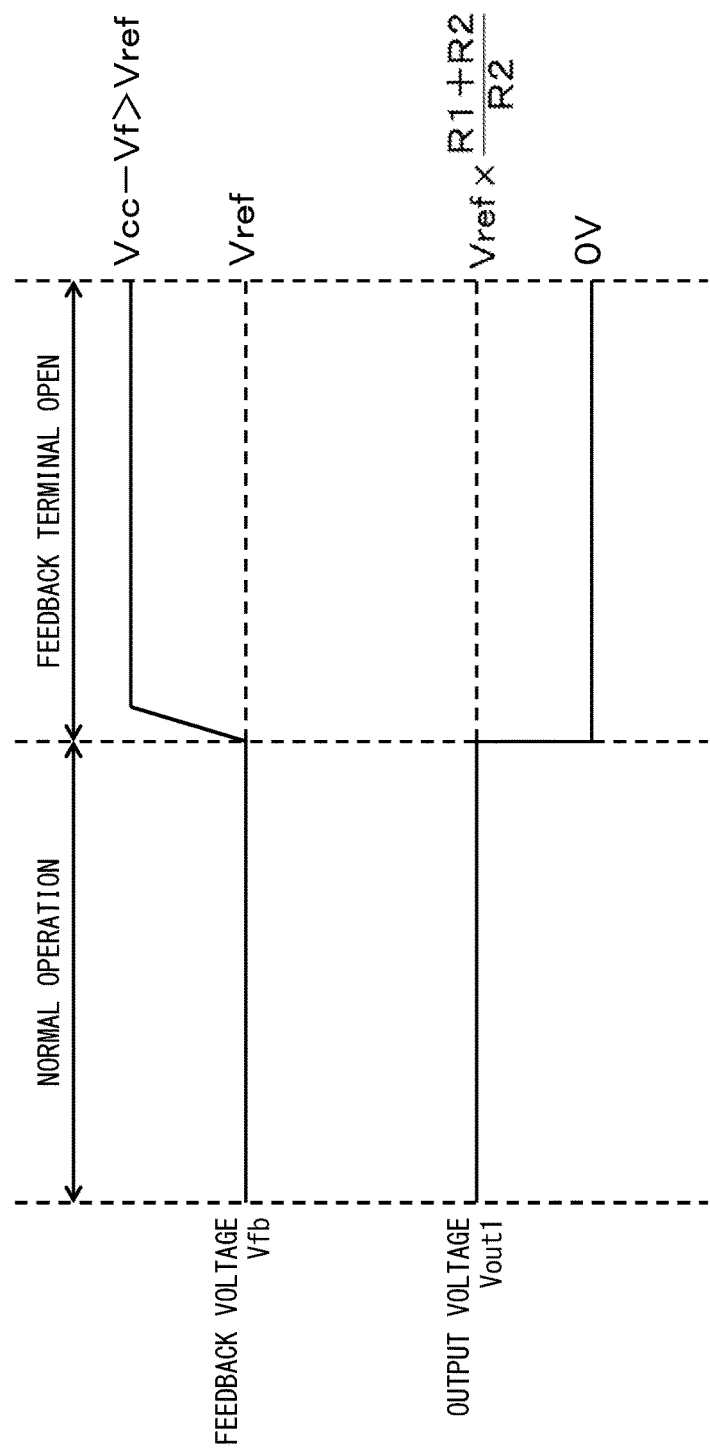
FIG. 10 is a schematic diagram showing relevant potentials observed when the power regulator shown in FIG. 9 is operating normally and when the feedback terminal is open.

FIG. 10 is a schematic diagram showing relevant potentials observed when the power regulator 1100 in FIG. 9 is operating normally and when the feedback terminal FB is open. Now, with reference to FIGS. 9 and 10, the circuit operation of the power regulator 1100 will be described.

When the power regulator 1100 is operating normally, the feedback voltage Vfb at the feedback terminal FB is stable around the reference voltage Vref. Thus, the output voltage Vout1 at the output terminal OUT also is stable. The relationship between the output voltage Vout1 at the output terminal OUT and the reference voltage Vref output from the reference voltage source 2 during normal operation is given by formula (4), where Vout1 represents the output voltage, Vref represents the reference voltage, r1 represents the resistance value of the resistor R1, and r2 represents the resistance value of the resistor R2.

$$Vout1=Vref \cdot ((r1+r2)/r2) \quad (4)$$

On the other hand, when the feedback terminal of the power regulator 1100 is open, the voltage holding circuit 10a holds the feedback voltage Vfb applied to the second input terminal T2 of the controller 3 at a value higher than the reference voltage Vref applied to the first input terminal T1. The relationship between the feedback voltage Vfb and the reference voltage Vref is given by formula (5), where Vfb represents the feedback voltage, Vcc represents the supply voltage at the power terminal (high-potential terminal) Vcc, Vf represents the emitter-base forward voltage of the PNP transistor Q10, and Vref represents the reference voltage.

$$Vfb=Vcc-Vf>Vref \quad (5)$$

The feedback voltage Vfb applied to the second input terminal T2 of the controller 3 is higher than the reference voltage Vref applied to the first input terminal T1 of the controller 3, and thus the output voltage Vout1 at the output terminal OUT equals 0 V.

As described above, when the feedback terminal FB lapses into an open state, the voltage holding circuit 10a holds the voltage applied to the second input terminal T2 of the controller 3 at a voltage higher than the value of the reference voltage Vref. As a result, the controller 3, the driver circuit 4, and the output stage 5 are driven so as to turn the output voltage Vout1 to 0 V. In this way, the load 9 connected to the output terminal OUT is prevented from deterioration and destruction.

Eighth Embodiment

Figure 11:
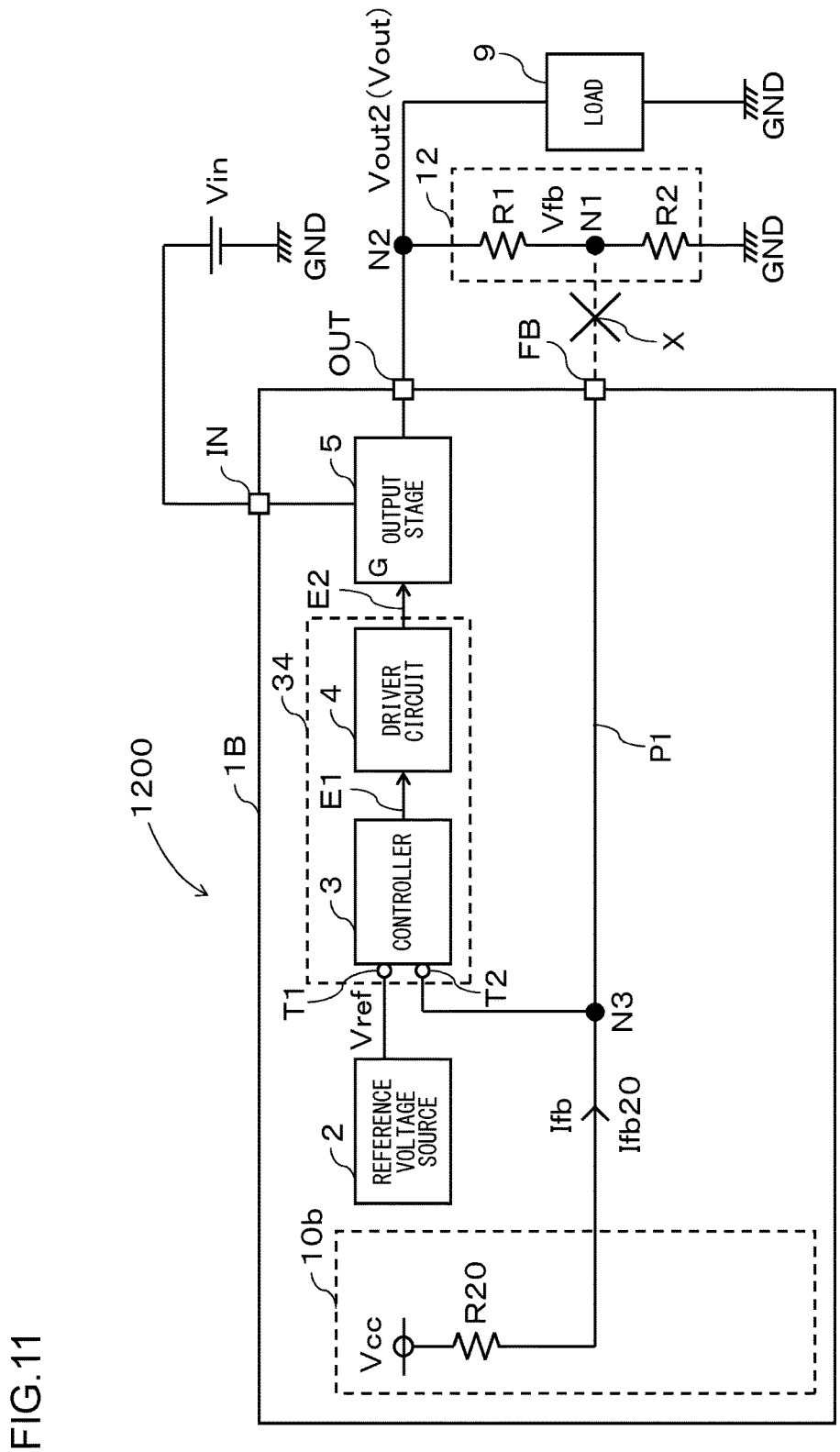
FIG. 11 is a block diagram of a power regulator according to an eighth embodiment of the present invention.

FIG. 11 is a block diagram of a power regulator 1200 according to an eighth embodiment of the present invention. Now, the eighth embodiment of the present invention will be described with reference to the relevant drawings.

An integrated circuit device 1B constituting the power regulator 1200 in FIG. 11 differs from the integrated circuit device 1A constituting the power regulator 1100 in FIG. 9 in the following aspects. The power regulator 1200 in FIG. 11 includes a voltage holding circuit 10b instead of the voltage holding circuit 10a in FIG. 9. Whereas the voltage holding circuit 10a in FIG. 9 is composed of a resistor and a transistor, the voltage holding circuit 10b in FIG. 11 is composed solely of a resistor, with no transistor.

The voltage holding circuit 10b includes a resistor R20. The resistor R20 in the voltage holding circuit 10b is connected between the power terminal (high-potential terminal) Vcc and the node N3. That is, the resistor R20 is connected to the conductor P1 to which the feedback voltage Vfb is fed.

When the feedback terminal FB lapses into an open state due to a disconnection X between the node N1 and the feedback terminal FB, the voltage holding circuit 10b holds the voltage applied to the second input terminal T2 of the controller 3 at a predetermined voltage. Specifically, when the feedback terminal FB lapses into an open state, the node N3 is held at a predetermined potential by the power terminal (high-potential terminal) Vcc and the resistor R20. As a result, the second input terminal T2 of the controller 3 is no longer indefinite but is held at a predetermined voltage. Here, the predetermined voltage is a voltage with a higher value than the reference voltage Vref Thus, the controller 3, the driver circuit 4, and the output stage 5 are driven to turn the output voltage Vout2 to 0 V. In this way, the load 9 connected to the output terminal OUT is prevented from deterioration and destruction.

In the power regulator 1200 in FIG. 11, as in the power regulator 1100 in FIG. 9, an error occurs between the output voltage Vout2 obtained with the voltage holding circuit 10b provided and the output voltage Vout obtained without the voltage holding circuit 10b provided. The level of the output voltage Vout obtained without the voltage holding circuit 10b provided is given again by formula (2) noted previously.

On the other hand, the level of the output voltage Vout2 obtained with the voltage holding circuit 10b provided is given by formula (6) below, where Vref represents the reference voltage, r1 represents the resistance value of the resistor R1, r2 represents the resistance value of the resistor R2, r20 represents the resistance value of the resistor R20, and Ifb represents the feedback path current that passes in normal operation.

$$Vout2 = ((r1+r2)/r2) \cdot Vref - r1 \cdot Ifb \quad (6)$$

Here, without the voltage holding circuit 10 provided, the output voltage Vout obtained is set originally at 5 V. On the other hand, with the voltage holding circuit 10a provided, the output voltage Vout2 equals 4.936 V, assuming that Vcc=5 V, Vfb=1 V, r1=80 kΩ, r2=20 kΩ, and r20=5 MΩ. Thus, the output voltage Vout2 obtained with the voltage holding circuit 10b provided contains an error of about −1.28% compared with the output voltage Vout obtained without the voltage holding circuit 10b. This error is about a hundred times as large as the error in the voltage holding circuit 10a shown in FIG. 9. The magnitude of the error here approximately equals the level of the current amplification factor hFE10 (=100) of the PNP transistor Q10 shown in FIG. 9. In FIG. 11, unlike in FIG. 9, the voltage holding circuit 10b can be configured with a single resistor, but the resistor R20 needs to be given a resistance value r20 that is larger than the resistance value r10 of the resistor R10.

Ninth Embodiment

Figure 12:
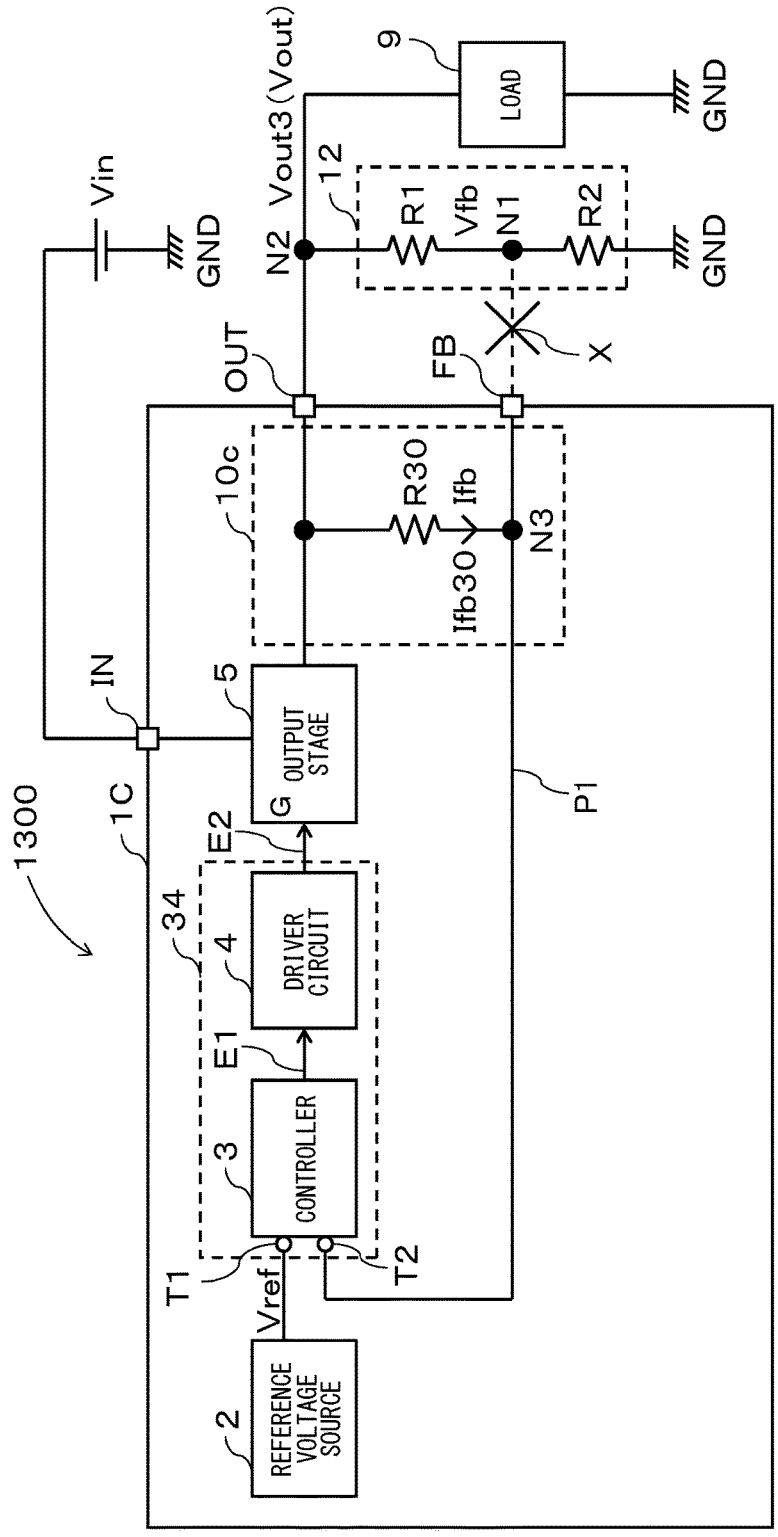
FIG. 12 is a block diagram of a power regulator according to a ninth embodiment of the present invention.

FIG. 12 is a block diagram of a power regulator 1300 according to a ninth embodiment of the present invention. Now, the ninth embodiment of the present invention will be described with reference to the relevant drawings.

An integrated circuit device 1C constituting the power regulator 1300 in FIG. 12 differs from the integrated circuit device 1A constituting the power regulator 1100 in FIG. 9 in the following aspect. The power regulator 1300 in FIG. 12 includes a voltage holding circuit 10c instead of the voltage holding circuit 10a in FIG. 9.

The voltage holding circuit 10c includes a resistor R30. The resistor R30 in the voltage holding circuit 10c is connected between the output terminal of the output stage 5 and the node N3. The resistor R30 is connected in parallel with the resistor R1, and serves to divert the feedback path current Ifb30 to the node N3, that is, to the conductor P1, when the feedback terminal FB is open.

In the power regulator 1300 in FIG. 12, as in the power regulator 1100 in FIG. 9, an error occurs between the output voltage Vout3 obtained with the voltage holding circuit 10c provided and the output voltage Vout obtained without the voltage holding circuit 10c provided. The level of the output voltage Vout obtained without the voltage holding circuit 10c provided is given again by formula (2) noted previously.

On the other hand, the level of the output voltage Vout3 obtained with the voltage holding circuit 10c provided is given by formula (7) below, where Vref represents the reference voltage, r1 represents the resistance value of the resistor R1, r2 represents the resistance value of the resistor R2, and r30 represents the resistance value of the resistor R30.

$$Vout3 = \{1+(r1 \cdot r30)/(r2 \cdot (r1+r30))\} \cdot Vref \quad (7)$$

Here, without the voltage holding circuit 10c provided, the output voltage Vout obtained is set originally at 5 V. On the other hand, with the voltage holding circuit 10c provided, the output voltage Vout3 equals 4.937 V, assuming that Vfb=1 V, r1=80 kΩ, r2=20 kΩ, and r30=5 MΩ. Thus, thus the output voltage Vout3 obtained with the voltage holding circuit 10c provided contains an error of about −1.26% compared with the output voltage Vout obtained without the voltage holding circuit 10c provided. This error approximately equals the error in the voltage holding circuit 10b shown in FIG. 11, namely −1.28%. To make the level of the output voltage Vout3 closer to the level of the output voltage Vout, the resistor R30 needs to be given a higher resistance value r30. For example, doubling the resistance value r30 of the resistor R30 from 5 MΩ to 10 MΩ reduces the error in the output voltage Vout3 from −1.26% to −0.64%.

When the feedback terminal FB lapses into an open state due to a disconnection X between the node N1 and the feedback terminal FB, the voltage holding circuit 10c holds the voltage applied to the second input terminal T2 of the controller 3 at a predetermined voltage. Specifically, when the feedback terminal FB lapses into an open state, the output voltage Vout3 is, as it is, fed back to the controller 3 via the resistor R30. Thus, the output stage 5 is controlled such that the output voltage Vout3 equals the reference voltage Vref, and the power regulator 1300 then operates as a buffer amplifier. In this way, the load 9 connected to the output terminal OUT is prevented from deterioration and destruction.

FIG. 13 is a schematic diagram showing relevant potentials observed when the power regulator 1300 is operating normally and when the feedback terminal FB is open. Now, with reference to FIGS. 12 and 13, the circuit operation of the power regulator 1300 will be described.

When the power regulator 1300 is operating normally, the feedback voltage Vfb at the feedback terminal FB is stable around the reference voltage Vref. Thus, the output voltage Vout3 at the output terminal OUT also is stable. The relationship between the output voltage Vout3 at the output terminal OUT and the reference voltage Vref output from the reference voltage source 2 during normal operation is given by formula (8), where Vout3 represents the output voltage, Vref represents the reference voltage, r1 represents the resistance value of the resistor R1, and r2 represents the resistance value of the resistor R2.

$$Vout3 = Vref \cdot ((r1+r2)/r2) \tag{8}$$

On the other hand, when the feedback terminal of the power regulator 1300 is open, the output voltage Vout3 is fed back to the second input terminal T2 of the controller 3 via the resistor R30. The relationship between the feedback voltage Vfb and the reference voltage Vref is given by formula (9), where Vfb represents the feedback voltage, Vout3 represents the output voltage, and Vref represents the reference voltage.

$$Vout3 = Vfb = Vref \tag{9}$$

As described above, when the feedback terminal FB lapses into an open state, the voltage holding circuit 10c holds the voltage applied to the second input terminal T2 of the controller 3 at the output voltage Vout3. That is, the power regulator 1300 then operates as a buffer amplifier. Thus, the controller 3, the driver circuit 4, and the output stage 5 are driven to turn the output voltage Vout3 to the reference voltage Vref. Here, the reference voltage Vref is lower than the output voltage Vout3, and thus the load 9 connected to the output terminal OUT is prevented from deterioration and destruction.

Tenth Embodiment

Figure 14:
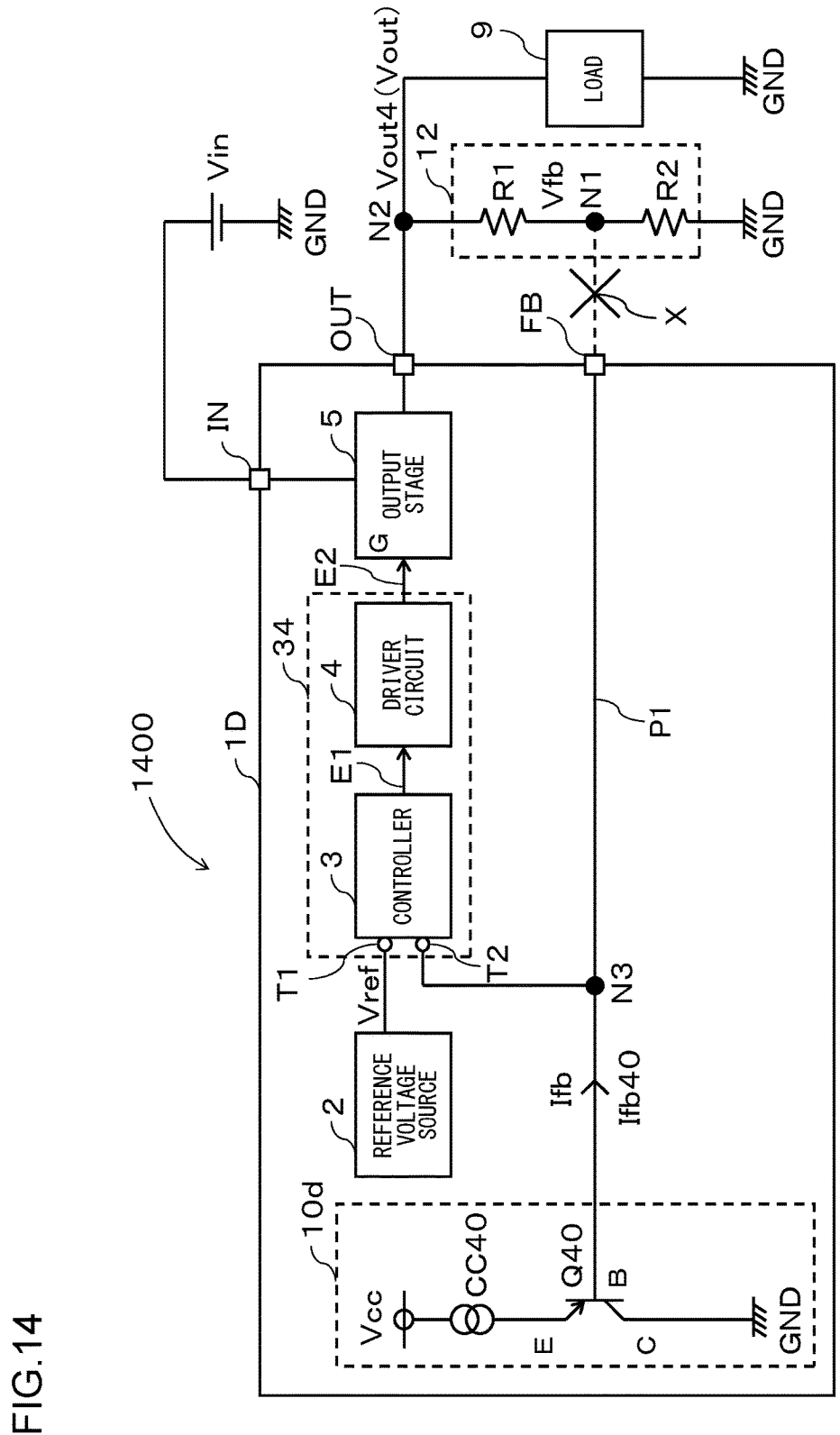
FIG. 14 is a block diagram of a power regulator according to a tenth embodiment of the present invention.

FIG. 14 is a block diagram of a power regulator 1400 according to a tenth embodiment of the present invention. Now, the tenth embodiment of the present invention will be described with reference to the relevant drawings.

An integrated circuit device 1D constituting the power regulator 1400 in FIG. 14 differs from the integrated circuit device 1A constituting the power regulator 1100 in FIG. 9 in the following aspects. The power regulator 1400 shown in FIG. 14 includes a voltage holding circuit 10d instead of the voltage holding circuit 10a in FIG. 9.

A collector C of a PNP transistor Q40 in the voltage holding circuit 10d is connected to a ground terminal (low-potential terminal) GND. A constant-current source CC40 is connected between an emitter E of the PNP transistor Q40 and a power terminal (high-potential terminal) Vcc. A base B of the PNP transistor Q40 in the voltage holding circuit 10d is connected to a node N3. That is, the base B of the PNP transistor Q40 is connected to the conductor P1 to which the feedback voltage Vfb is fed.

When the feedback terminal FB lapses into an open state due to a disconnection X between the node N1 and the feedback terminal FB, the voltage holding circuit 10d holds the voltage applied to the second input terminal T2 of the controller 3 at a predetermined voltage. Specifically, when the feedback terminal FB lapses into an open state, the base current Ifb of the PNP transistor Q40 substantially loses the path for it to pass through, and the collector current of the PNP transistor Q40 substantially ceases to pass. Thus, the emitter voltage of the PNP transistor Q40 becomes approximately equal to the voltage at the power terminal (high-potential terminal) Vcc. Here, an unillustrated parasitic resistance is present between the node N3 and an unillustrated circuit board. Thus, with the feedback terminal FB in an open state, a negligibly low base current Ifb40 passes via the emitter E and the base B of the PNP transistor Q10 and the unillustrated parasitic resistance. Thus, let the voltage at the power terminal (high-potential terminal) Vcc be Vcc, then the base voltage of the PNP transistor Q40 equals Vcc-Vf. As a result, the second input terminal T2 of the controller 3, which is at the same potential as the node N3, is no longer indefinite but is held at a predetermined voltage. Here, the predetermined voltage is a voltage with a higher value than the reference voltage Vref. Thus, the controller 3, the driver circuit 4, and the output stage 5 are driven to turn the output voltage Vout4 to 0 V when the feedback terminal FB is in an open state. In this way, the load 9 connected to the output terminal OUT is prevented from deterioration and destruction.

When the power regulator 1400 is operating normally, the base current Ifb40, which depends on the constant current generated by the constant-current source CC40 and the current amplification factor hFE40 of the PNP transistor Q40, passes toward the feedback terminal FB. Accordingly, as in the voltage holding circuit 10a shown in FIG. 9, the level of the output voltage Vout4 obtained with the voltage holding circuit 10d provided contains an error compared with the level of the output voltage Vout obtained without the voltage holding circuit 10d provided. That is, even using the voltage holding circuit 10d in FIG. 14 does not stop the output voltage Vout4 from depending on the current amplification factor hFE40 of the PNP transistor Q40. To eliminate variation of the current amplification factor hFE40, the PNP transistor Q40 may be configured in a Darlington connection. Or, to eliminate variation of the current amplification factor hFE40, a configuration may be adopted where the magnitude of the constant current from the constant-current source CC40 is adjusted according to the level of the current amplification factor hFE40 of the PNP transistor Q40. That is, a configuration may be adopted where, as the current amplification factor hFE40 of the PNP transistor Q40 increases, the constant current generated by the constant-current source CC40 increases and, as the current amplification factor hFE40 decreases, the constant current generated by the constant-current source CC40 decreases, in order to restrict the range of variation of the base current Ifb40 of the PNP transistor Q40.

Eleventh Embodiment

Figure 15:
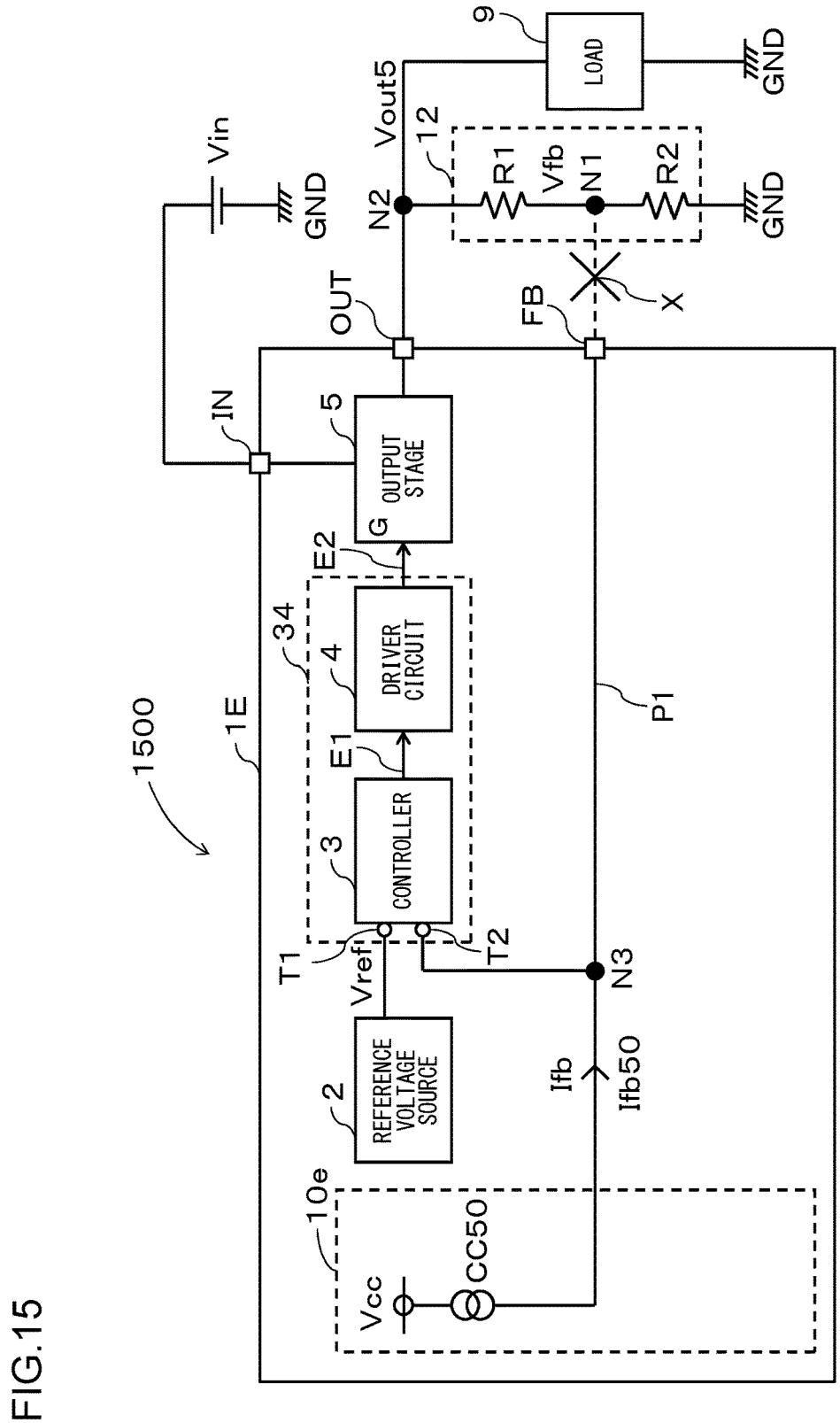
FIG. 15 is a block diagram of a power regulator according to an eleventh embodiment of the present invention.

FIG. 15 is a block diagram of a power regulator 1500 according to an eleventh embodiment of the present invention. Now, the eleventh embodiment of the present invention will be described with reference to the relevant drawings.

An integrated circuit device 1E constituting the power regulator 1500 in FIG. 15 differs from the integrated circuit device 1A constituting the power regulator 1100 in FIG. 9 in the following aspects. The power regulator 1500 in FIG. 15 includes a voltage holding circuit 10e instead of the voltage holding circuit 10a in FIG. 9. In the power regulator 1500 in FIG. 15, unlike in the power regulator 1400 in FIG. 14, no PNP transistor is used.

The voltage holding circuit 10e includes a constant-current source CC50. The constant-current source CC50 in the voltage holding circuit 10e is connected between a power terminal (high-potential terminal) Vcc and a node N3. That is, the constant-current source CC50 is connected to the conductor P1 to which the feedback voltage Vfb is fed. The constant-current source CC50 is configured, specifically, as a current-mirror circuit. The current-mirror circuit may be composed of bipolar transistors, or may be composed of MOS transistors. Whichever type of transistors may be used, forming a current-mirror circuit requires three to four transistors plus one to two resistors; even so, forming one is beneficial because then the feedback path current Ifb that passes through the node N3 during normal operation can be set at a very low level.

When the feedback terminal FB lapses into an open state due to a disconnection X between the node N1 and the feedback terminal FB, the voltage holding circuit 10e holds the voltage applied to the second input terminal T2 of the controller 3 at a predetermined voltage. Specifically, when the feedback terminal FB lapses into an open state, the constant current Ifb50 from the constant-current source CC50 substantially loses the path for it to pass through. Thus, the voltage at the node N3 becomes approximately equal to the voltage at the power terminal (high-potential terminal) Vcc. As a result, the second input terminal T2 of the controller 3, which is at the same potential as the node N3, is no longer indefinite but is held at a predetermined voltage. Here, the predetermined voltage is a voltage with a higher value than the reference voltage Vref. Thus, the controller 3, the driver circuit 4, and the output stage 5 are driven to turn the output voltage Vout5 to 0 V when the feedback terminal FB is in an open state. In this way, the load 9 connected to the output terminal OUT is prevented from deterioration and destruction.

Twelfth Embodiment

Figure 16:
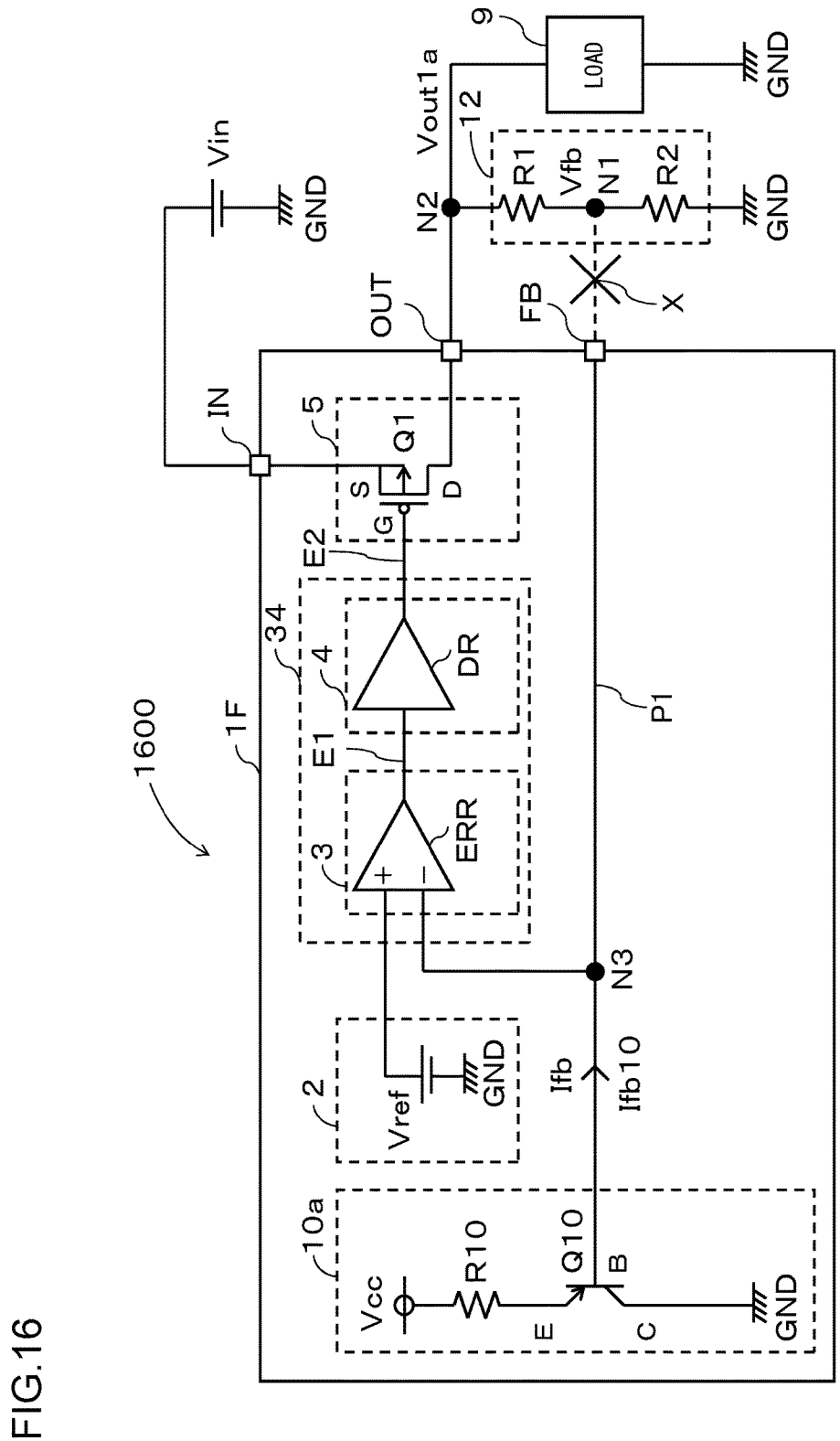
FIG. 16 is a block diagram of a power regulator according to a twelfth embodiment of the present invention.

FIG. 16 is a schematic circuit diagram (corresponding to a twelfth embodiment of the present invention) of an example where the voltage holding circuit 10a in the power regulator 1100 shown in FIG. 9 according to the seventh embodiment of the present invention is applied to a series regulator, which is a type of linear regulator. Now, the twelfth embodiment of the present invention will be described with reference to the relevant drawings.

In FIG. 16, an integrated circuit device 1F constituting a power regulator 1600 includes a reference voltage source 2, a control circuit 34, an output stage 5, a voltage holding circuit 10a, an input terminal IN, an output terminal OUT, and a feedback terminal FB. The integrated circuit device 1F is configured as, for example, a semiconductor integrated circuit device. The integrated circuit device 1F is provided with, in addition to the input terminal IN, the output terminal OUT, and the feedback terminal FB, other external terminals, which are unillustrated. The control circuit 34 includes a controller 3 and a driver circuit 4. The controller 3 includes an error amplifier ERR. The driver circuit 4 includes a driver DR. The output stage 5 includes a PMOS transistor Q1. The voltage holding circuit 10a includes a resistor R10 and a PNP transistor Q10. The PMOS transistor Q1 in the output stage 5 in FIG. 16 may instead be an NMOS transistor, or a bipolar transistor.

An output terminal of the reference voltage source 2 is connected to a non-inverting input terminal (+) of the error amplifier ERR in the controller 3. The reference voltage source 2 generates a reference voltage Vref. The reference voltage source 2 is configured as, for example, a bandgap voltage circuit. The reference voltage Vref is, for example, from 1 V to 5 V.

An inverting input terminal (−) of the error amplifier ERR in the controller 3 is connected via a node N3 to the feedback terminal FB of the integrated circuit device 1F across a conductor P1. An output terminal of the controller 3 is connected to an input terminal of the driver circuit 4. The controller 3 compares the reference voltage Vref of the reference voltage source 2 with a feedback voltage fed in via the feedback terminal FB, and outputs a control voltage E1 which is commensurate with the result of the comparison. The controller 3 includes, for example, a phase compensation circuit, various protection circuits, etc., of which none are illustrated. The various protection circuits include, for example, a temperature protection circuit and an overvoltage protection circuit.

The driver circuit 4 is used to drive the output stage 5. An output terminal of the driver DR in the driver circuit 4 is connected to a gate G of the PMOS transistor Q1 in the output stage 5. The driver circuit 4 operates based on the control voltage E1 from the controller 3, and outputs a drive voltage E2.

A source S of the PMOS transistor Q1 in the output stage 5 is connected to the input terminal IN of the integrated circuit device 1F. To the input terminal IN, an input voltage Vin is applied. A drain D of the PMOS transistor Q1 in the output stage 5 is connected to the output terminal OUT of the integrated circuit device 1F. The PMOS transistor Q1 in the output stage 5 is driven based on the drive voltage E2 from the driver circuit 4, and generates an output voltage Vout1a from the input voltage Vin fed in via the input terminal IN to feed the output voltage Vout1a to the output terminal OUT of the integrated circuit device 1F. The input voltage Vin is, for example, from 2.5 V to 100 V. The output voltage Vout1a is, for example, from 0.6 V to 40 V.

The output terminal OUT is connected to a node N2. Between the node N2 and a node N1, a resistor R1 is connected. Between the node N1 and a ground terminal (low-potential terminal) GND, a resistor R2 is connected. The resistors R1 and R2 constitute a voltage division circuit 12. The node N1 is connected to the feedback terminal FB of the integrated circuit device 1F. The output voltage Vout1a is divided by the resistors R1 and R2. Thus, a feedback voltage Vfb appears at the node N1, and the feedback voltage Vfb is fed to the feedback terminal FB. The resistors R1 and R2 are each, for example, from several kilohms to several megohms.

To the output terminal OUT, a load 9 is connected via the node N2. The load 9 is, for example, a CPU, MPU, sensor, motor, or the like.

The configuration and operation of the voltage holding circuit 10a in FIG. 6 are similar to those of the voltage holding circuit 10a in FIG. 9. Instead of the voltage holding circuit 10a in FIG. 16, any one of the voltage holding circuits 10b, 10c, 10d, and 10e shown in FIGS. 11 to 15 respectively may be used.

Thirteenth Embodiment

Figure 17:
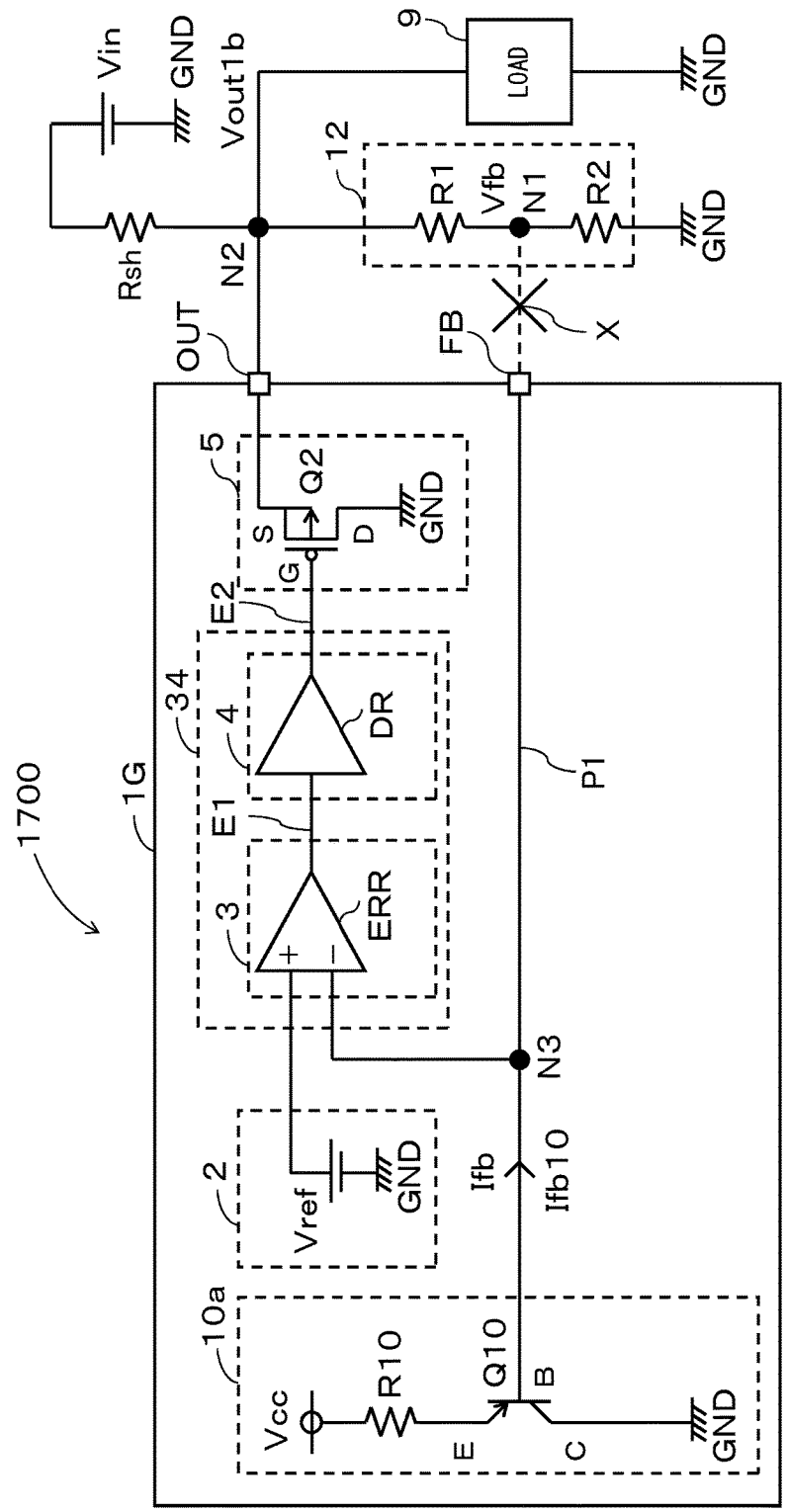
FIG. 17 is a block diagram of a power regulator according to a thirteenth embodiment of the present invention.

FIG. 17 is a schematic circuit diagram (corresponding to a thirteenth embodiment of the present invention) of an example where the voltage holding circuit 10a in the power regulator 1100 shown in FIG. 9 according to the seventh embodiment of the present invention is applied to a shunt regulator, which is a type of linear regulator. Now, the thirteenth embodiment of the present invention will be described with reference to the relevant drawings.

A power regulator 1700 in FIG. 17 differs from the power regulator 1600 in FIG. 16 in the following aspects. Instead of the PMOS transistor Q1 in the output stage 5, a PMOS transistor Q2 is provided. Moreover, a resistor Rsh called a shunt resistor is provided. The PMOS transistor Q2 in output stage 5 in FIG. 17 may instead be an NMOS transistor, or a bipolar transistor.

An output terminal of the driver DR in the driver circuit 4 is connected to the gate G of the PMOS transistor Q2 in the output stage 5. A source S of the PMOS transistor Q2 in the output stage 5 is connected to the output terminal OUT of the integrated circuit device 1G. To the output terminal OUT, an input voltage Vin is applied via a resistor Rsh. A drain D of the PMOS transistor Q2 in the output stage 5 is connected to a ground terminal (low-potential terminal) GND. The PMOS transistor Q2 in the output stage 5 is driven based on a drive voltage E2 from the driver circuit 4, and generates an output voltage Vout1b from the input voltage Vin to feed the output voltage Vout1b to the output terminal OUT of the integrated circuit device 1G. The input voltage Vin is, for example, from 2.5 V to 100 V. The output voltage Vout1b is, for example, from 0.6 V to 40 V.

The configuration and operation of the voltage holding circuit 10a in FIG. 17 are similar to those of the voltage holding circuit 10a in FIG. 9. Instead of the voltage holding circuit 10a in FIG. 17, any one of the voltage holding circuits 10b, 10c, 10d, and 10e shown in FIGS. 11 to 15 respectively may be used.

Fourteenth Embodiment

Figure 18:
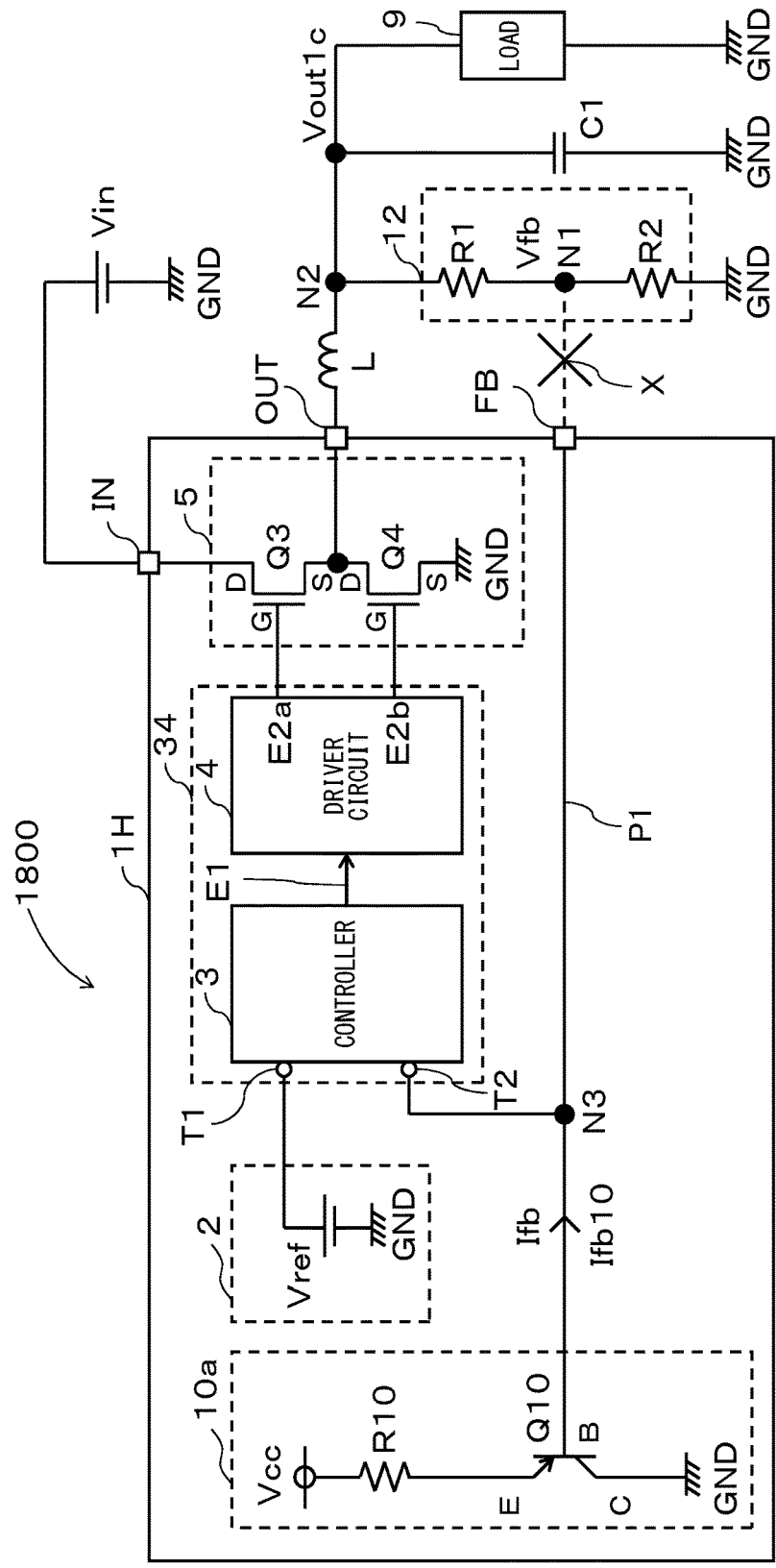
FIG. 18 is a block diagram of a power regulator according to a fourteenth embodiment of the present invention.

FIG. 18 is a schematic circuit diagram (corresponding to a fourteenth embodiment of the present invention) of an example where the voltage holding circuit 10a in the power regulator 1100 shown in FIG. 9 according to the seventh embodiment of the present invention is applied to a step-down synchronous-rectification DC/DC converter, which is a type of switching regulator. Now, the fourteenth embodiment of the present invention will be described with reference to the relevant drawings.

A power regulator 1800 in FIG. 18 differs from the power regulator 1600 in FIG. 16 in the following aspects. Instead of the PMOS transistor Q1 in the output stage 5, a switching transistor Q3 and a synchronous-rectification transistor Q4 are provided in the output stage 5. Moreover, an inductor L and a capacitor C1 are provided outside an integrated circuit device 1H.

A first output terminal of the driver circuit 4 is connected to a gate G of the switching transistor Q3 in the output stage 5. A second output terminal of the driver circuit 4 is connected to a gate G of the synchronous-rectification transistor Q4 in the output stage 5. The driver circuit 4 operates based on a control voltage E1 from the controller 3, and turns ON and OFF complementarily the switching transistor Q3 and the synchronous-rectification transistor Q4 in the output stage 5.

A drain D of the switching transistor Q3 in the output stage 5 is connected to the input terminal IN of the integrated circuit device 1H. To the input terminal IN, an input voltage Vin is applied. A source S of the switching transistor Q3 is connected to the drain D of the synchronous-rectification transistor Q4. A source S of the synchronous-rectification transistor Q4 is connected to a ground terminal (low-potential terminal) GND. Thus, the switching transistor Q3 and the synchronous-rectification transistor Q4 in the output stage 5 are connected in series between the input terminal IN and the ground terminal (low-potential terminal) GND. The output terminal OUT of the integrated circuit device 1H is connected to the common node between the switching transistor Q3 and the synchronous-rectification transistor Q4. The switching transistor Q3 and the synchronous-rectification transistor Q4 in the output stage 5 are driven complementarily by drive voltages E2a and E2b from the driver circuit 4, and generate an output voltage Vout1c from the input voltage Vin fed in via the input terminal IN to feed the output voltage Vout to the output terminal OUT. The integrated circuit device 1H is of a step-down type, and the output voltage Vout1c is lower than the input voltage Vin. The input voltage Vin is, for example, from 2.5 V to 100 V. The output voltage Vout is, for example, from 0.6 V to 40 V.

Here, "complementarily" covers not only operation where the ON and OFF states of the switching transistor Q3 and the synchronous-rectification transistor Q4 are completely reversed but also operation where, with a view to preventing a through current, a predetermined delay, that is, a dead time, is provided in the ON-OFF transition timing of the switching transistor Q3 and the synchronous-rectification transistor Q4.

Although here the switching transistor Q3 and the synchronous-rectification transistor Q4 are both assumed to be NMOS transistors (N-channel metal-oxide-semiconductor field-effect transistors), the switching transistor Q3 may instead be a PMOS transistor (P-channel metal-oxide-semiconductor field-effect transistors) while the synchronous-rectification transistor Q4 is an NMOS transistor. In a case where an NMOS transistor is used as the switching transistor Q3, a bootstrap circuit is used that includes a diode and a capacitor, of which neither is illustrated. The bootstrap circuit permits the switching transistor Q3 to turn ON reliably. As the switching transistor Q3 and the synchronous-rectification transistor Q4, instead of MOS transistors, bipolar transistors may be used.

The output terminal OUT is connected via the inductor L to a node N2. Between the node N2 and a node N1, an resistor R1 is connected, which is a resistor external to the integrated circuit device 1H. Between the node N1 and the ground terminal (low-potential terminal) GND, a resistor R2 is connected. The resistors R1 and R2 constitute a voltage division circuit 12. The node N1 is connected to the feedback terminal FB of the integrated circuit device 1H. The output voltage Vout1c is divided by the resistors R1 and R2. Thus, a feedback voltage Vfb appears at the node N1, and the feedback voltage Vfb is fed to the feedback terminal FB. The resistors R1 and R2 are each, for example, from several kilohms to several megohms.

The inductor L is connected between the output terminal OUT of the integrated circuit device 1H and the node N2. The capacitor C1 is connected between the node N2 and the ground terminal (low-potential terminal) GND. The inductor L and the capacitor C1 constitute a smoothing circuit.

To the node N2, a load 9 is connected. The load 9 is, for example, a CPU, MPU, sensor, motor, or the like.

The configuration and operation of the voltage holding circuit 10a in FIG. 18 are similar to those of the voltage holding circuit 10a in FIG. 9. Instead of the voltage holding circuit 10a in FIG. 18, any one of the voltage holding circuits 10b, 10c, 10d, and 10e shown in FIGS. 11 to 15 respectively may be used.

Fifteenth Embodiment

Figure 19:
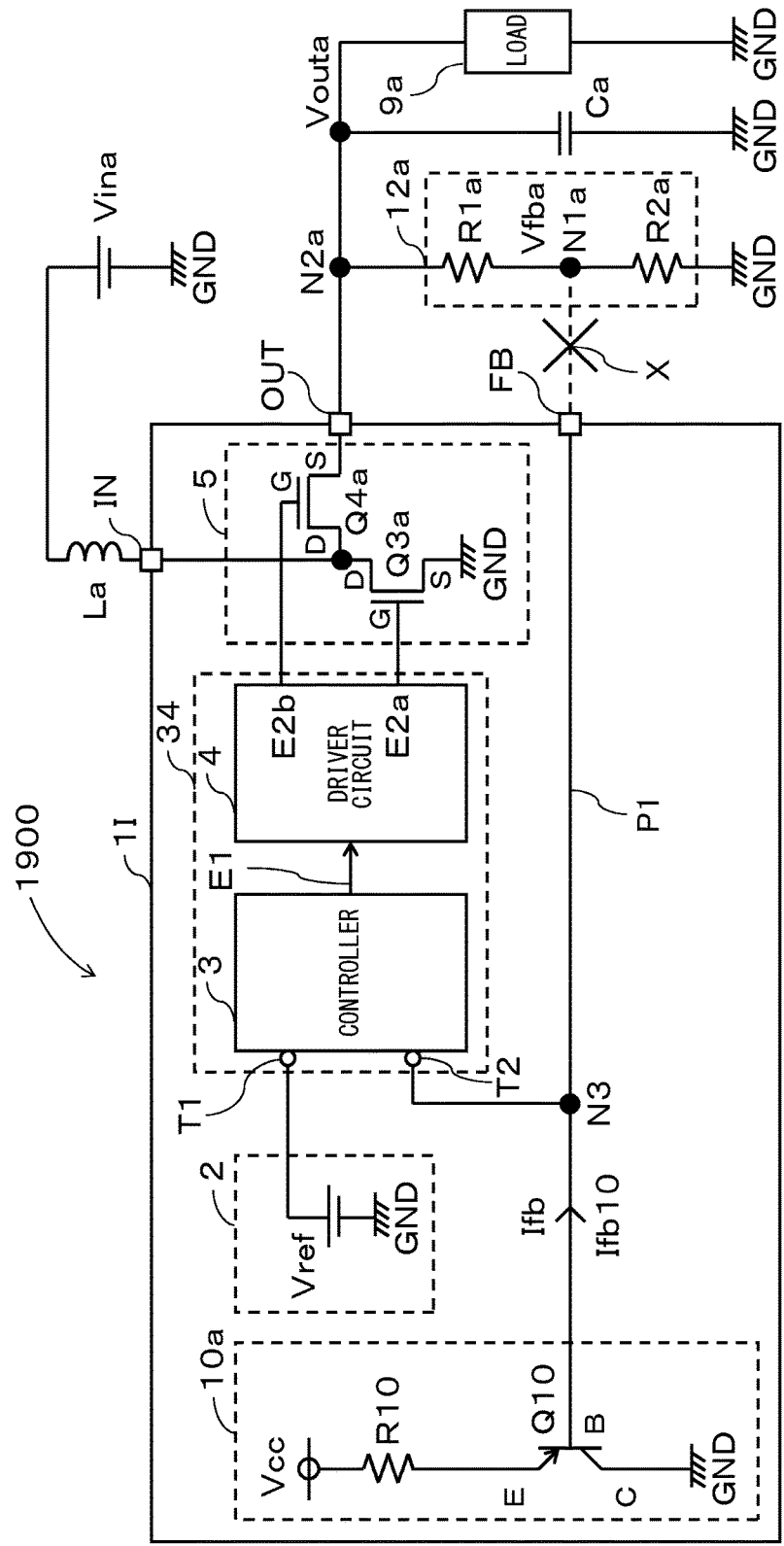
FIG. 19 is a block diagram of a power regulator according to a fifteenth embodiment of the present invention.

FIG. 19 is a schematic circuit diagram (corresponding to a fifteenth embodiment of the present invention) of an example where the voltage holding circuit 10a in the power regulator 1100 shown in FIG. 9 according to the seventh embodiment of the present invention is applied to a step-up synchronous-rectification DC/DC converter, which is a type of switching regulator. Now, the fifteenth embodiment of the present invention will be described with reference to the relevant drawings.

A power regulator 1900 in FIG. 19 differs from the power regulator 1600 in FIG. 16 in the following aspects. Instead of the PMOS transistor Q1 in the output stage 5, a switching transistor Q3a and a synchronous-rectification transistor Q4a are provided in the output stage 5. Moreover, an inductor La and a capacitor Ca are provided outside an integrated circuit device 1I.

A first output terminal of the driver circuit 4 is connected to a gate G of the synchronous-rectification transistor Q4a in the output stage 5. A second output terminal of the driver circuit 4 is connected to a gate G of the switching transistor Q3a in the output stage 5. The driver circuit 4 operates based on a control voltage E1 from the controller 3, and turns ON and OFF complementarily the switching transistor Q3a and the synchronous-rectification transistor Q4a in the output stage 5.

A source S of the switching transistor Q3a in the output stage 5 is connected to a ground terminal (low-potential terminal) GND. A drain D of the switching transistor Q3a is connected to the input terminal IN of the integrated circuit device 1I. To the input terminal IN, an input voltage Vina is applied via the inductor La. A drain D of the synchronous-rectification transistor Q4a is connected to the input terminal IN of the integrated circuit device H. A source S of the synchronous-rectification transistor Q4a is connected to the output terminal OUT of the integrated circuit device H. The switching transistor Q3a and the synchronous-rectification transistor Q4a in the output stage 5 are driven complementarily by drive voltages E2a and E2b from the driver circuit 4, and generate an output voltage Vouta from the input voltage Vina fed in via the input terminal IN to feed the output voltage Vouta to the output terminal OUT. The integrated circuit device 1I is of a step-up type, and the output voltage Vouta is higher than the input voltage Vina. The input voltage Vina is, for example, from 0.6 V to 40 V. The output voltage Vouta is, for example, from 2.5 V to 100 V.

Here, "complementarily" covers not only operation where the ON and OFF states of the switching transistor Q3a and the synchronous-rectification transistor Q4a are completely reversed but also operation where, with a view to preventing a through current, a predetermined delay, that is, a dead time, is provided in the ON-OFF transition timing of the switching transistor Q3a and the synchronous-rectification transistor Q4a.

Although here the switching transistor Q3a and the synchronous-rectification transistor Q4a are both assumed to be NMOS transistors, the synchronous-rectification transistor Q4a may instead be a PMOS transistor while the switching transistor Q3a is an NMOS transistor. In a case where an NMOS transistor is used as the synchronous-rectification transistor Q4a, a bootstrap circuit is used that includes a diode and a capacitor, of which neither is illustrated. The bootstrap circuit permits the synchronous-rectification transistor Q4a to turn ON reliably. As the switching transistor Q3a and the synchronous-rectification transistor Q4a, instead of MOS transistors, bipolar transistors may be used.

The output terminal OUT is connected to a node N2a. Between the node N2a and a node N1a, and resistor R1a is connected. Between the node N1a and the ground terminal (low-potential terminal) GND, a resistor R2a is connected. The resistors R1a and R2a constitute a voltage division circuit 12a. The node N1a is connected to the feedback terminal FB of the integrated circuit device 1I. The output voltage Vout1a is divided by the resistors R1a and R2a. Thus, a feedback voltage Vfba appears at the node N1a, and the feedback voltage Vfba is fed to the feedback terminal FB. The resistors R1a and R2a are each, for example, from several kilohms to several megohms. The capacitor Ca is connected between the node N2a and the ground terminal (low-potential terminal) GND.

To the node N2a, a load 9a is connected. The load 9a is, for example, a CPU, MPU, sensor, motor, or the like.

The configuration and operation of the voltage holding circuit 10a in FIG. 19 are similar to those of the voltage holding circuit 10a in FIG. 9. Instead of the voltage holding circuit 10a in FIG. 19, any one of the voltage holding circuits 10b, 10c, 10d, and 10e shown in FIGS. 11 to 15 respectively may be used.

Sixteenth Embodiment

Figure 20:
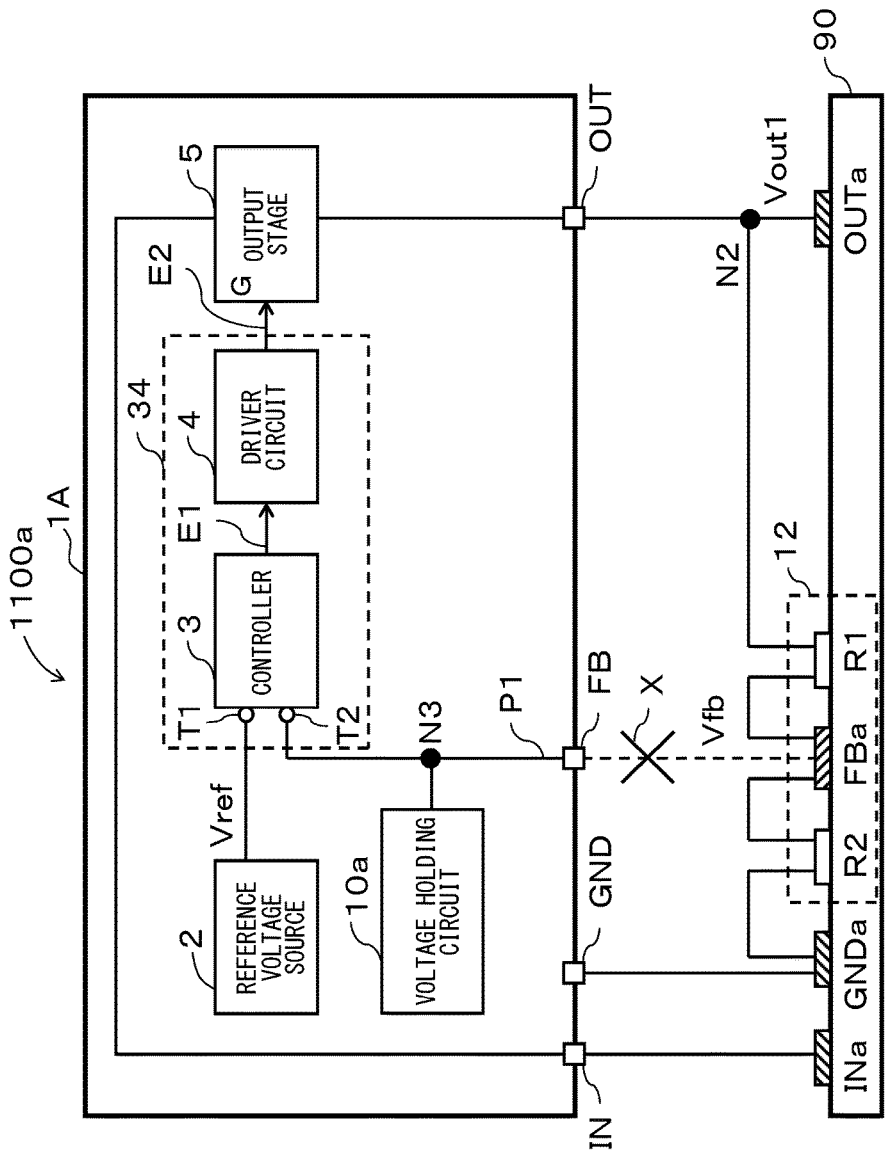
FIG. 20 is a block diagram of a power regulator according to a sixteenth embodiment of the present invention.

FIG. 20 is a structure diagram (corresponding to a sixteenth embodiment of the present invention) of a power regulator device 1100a in which the power regulator 1100 according to the ninth embodiment of the present invention is mounted on a circuit board. The integrated circuit device 1A constituting the power regulator 1100 in FIG. 9 and the integrated circuit device 1A constituting the power regulator device 1100a in FIG. 20 are the same in configuration and interconnection. Now, the sixteenth embodiment of the present invention will be described with reference to the relevant drawings.

In FIG. 20, the input terminal IN of the integrated circuit device 1A is connected to an input terminal INa of a circuit board 90. The output terminal OUT of the integrated circuit device 1A is connected to an output terminal OUTa of the circuit board 90. The ground terminal (low-potential terminal) GND of the integrated circuit device 1A is connected to a ground terminal (low-potential terminal) GNDa of the circuit board 90. The feedback terminal FB of the integrated circuit device 1A is connected to a feedback terminal FBa of the circuit board 90. However, in FIG. 20, it is assumed that a disconnection (a broken wire or the like) X cuts off conduction between the feedback terminal FB of the integrated circuit device 1A and the feedback terminal FBa of the circuit board 90.

The resistor R1, which is mounted on the circuit board 90, is connected between the output terminal OUTa of the circuit board 90 and the feedback terminal FBa of the circuit board 90. The resistor R2, which is mounted on the circuit board 90, is connected between the feedback terminal FBa of the circuit board 90 and the ground terminal (low-potential terminal) GNDa of the circuit board 90. The resistors R1 and R2 constitute the voltage division circuit 12.

In FIG. 20, due to an error in mounting the feedback terminal FB, an error in mounting the resistor R1, an error in mounting the resistor R2, or any other inadvertent accident or the like, a disconnection (a broken wire or the like) X can occur, leaving open the path between the feedback terminal FB of the integrated circuit device 1A and the feedback terminal FBa of the circuit board 90. When this happens, the open detection circuit 10a in the integrated circuit device 1A detects the feedback terminal FB of the integrated circuit device 1A being open due to the disconnection X between the feedback terminal FB of the integrated circuit device 1A and the feedback terminal FBa of the circuit board 90, and holds the voltage applied to the second input terminal T2 of the controller 3 at a predetermined voltage.

The DC/DC converters according to the fourteenth and fifteenth embodiments of the present invention can be applied to step-up/down DC/DC converters that can operate as both step-up and step-down converters.

In a power regulator, a feedback terminal left open greatly influences the setting of the output voltage at an output terminal. Moreover, to the feedback terminal, at least two externally fitted resistors are connected, and in addition those resistors each have two terminals; this contributes to a higher probability of the feedback terminal becoming open than other external terminals. Out of these considerations, in all of the power regulators according to the ninth to sixteenth embodiments, owing to the provision of the voltage holding circuit, the output of the power regulator is almost fully cut off when the feedback terminal lapses into an open state due to an error in mounting the feedback terminal, an error in mounting an externally fitted resistor, or any other inadvertent terminal-opening accident or the like. The power regulator then ceases to output the output voltage, and thus the load connected to the output terminal is prevented from deterioration and destruction.

Power regulators according to the present invention can be applied to both linear regulators and switching regulators, and to any of step-down, step-up, and step-up/down regulators. Seeing that a negative feedback circuit necessarily includes a feedback terminal and necessarily compares a feedback voltage fed to the feedback terminal with a reference voltage, power regulators according to the present invention can be applied to any circuits in general that include a negative feedback circuit. Thus, the application of the present invention is not limited to power regulators. In the present invention, an open state includes not only the state where the path between the feedback terminal and the voltage division circuit is open but also the state where the part of the conductor P1 leading from the feedback terminal to the node N3 is broken. That is, a break in the part of the conductor P1 leading from the feedback terminal to the node N3 can be coped with equally well.

Correspondence Between Components in the Seventh to Fifteenth Embodiments and Claimed Elements In the twelfth embodiment, the PMOS transistor Q1 corresponds to a transistor. In the thirteenth embodiment, the PMOS transistor Q2 corresponds to a transistor. In the fourteenth embodiment, the switching transistor Q3 corresponds to a transistor. In the fifteenth embodiment, the synchronous-rectification transistor Q4a corresponds to a transistor. In the seventh and twelfth to fifteenth embodiments, the resistor R10 corresponds to a first resister. In the eighth embodiment, the resistor R20 corresponds to a second resistor. In the ninth embodiment, the resistor R30 corresponds to a third resistor. In the tenth embodiment, the constant-current source CC40 corresponds to a first constant-current source. In the eleventh embodiment, the constant-current source CC50 corresponds to a second constant-current source.

INDUSTRIAL APPLICABILITY

The present invention finds application in electronic appliances, OA appliances, and the like. Thus, the present invention has high industrial applicability.

What is claimed is:
1. A power regulator comprising:
an input terminal arranged to receive an input voltage;
an output terminal arranged to output an output voltage;
a transistor connected to the input terminal and to the output terminal;
a feedback terminal arranged to receive a feedback voltage having a predetermined relationship with the output voltage;
a control circuit configured to feed a drive voltage to a gate of the transistor based on the feedback voltage and a reference voltage so as to keep the output voltage constant; and
an open detection circuit configured to detect an open state of the feedback terminal and, on detecting the open state, to vary the reference voltage and thereby keep the transistor in an OFF state by keeping the drive voltage at a predetermined level, wherein the open detection circuit includes:
a PNP transistor having
a base connected to the feedback terminal,
a collector connected to a low-potential terminal, and
an emitter connected via a first resistor to a power terminal;
a first PMOS transistor having
a gate connected to the emitter of the PNP transistor,
a source connected to the power terminal, and
a drain connected via a second resistor to the low-potential terminal;
a second PMOS transistor having
a gate connected to the drain of the first PMOS transistor,
a source connected to the power terminal, and
a drain connected via a third resistor to the low-potential terminal; and
an NMOS transistor having
a gate connected to the drain of the second PMOS transistor,
a source connected to the low-potential terminal, and
a drain fed with the reference voltage.
2. The power regulator of claim 1, wherein the open detection circuit is configured to keep the transistor in the OFF state by switching the reference voltage to a constant voltage lower than the reference voltage on detecting the open state.
3. The power regulator of claim 1, wherein the control circuit includes:
a controller configured to output a control voltage based on the feedback voltage at the feedback terminal and the reference voltage; and
a driver circuit configured to output the drive voltage based on the control voltage, and
the open detection circuit is configured to control at least either of the controller and the driver circuit to keep the transistor in the OFF state on detecting the open state.
4. The power regulator of claim 1, wherein the power regulator is a linear regulator.
5. The power regulator of claim 1, wherein the power regulator is a switching regulator.
6. The power regulator of claim 2, wherein the constant voltage approximately equals 0 V.

7. A power regulator comprising:
an input terminal arranged to receive an input voltage;
an output terminal arranged to output an output voltage;
a transistor connected to the input terminal and to the output terminal;
a feedback terminal arranged to receive a feedback voltage having a predetermined relationship with the output voltage;
a control circuit configured to feed a drive voltage to a gate of the transistor based on the feedback voltage and a reference voltage so as to keep the output voltage constant; and
an open detection circuit configured to detect an open state of the feedback terminal and, on detecting the open state, to vary the reference voltage and thereby keep the transistor in an OFF state by keeping the drive voltage at a predetermined level, wherein the open detection circuit includes:
a PNP transistor having
a base connected to the feedback terminal,
a collector connected to a low-potential terminal, and
an emitter connected via a first resistor to a power terminal;
a first PMOS transistor having
a gate connected to the emitter of the PNP transistor,
a source connected to the power terminal, and
a drain connected via a second resistor to the low-potential terminal;
a second PMOS transistor having
a gate connected to the drain of the first PMOS transistor,
a source connected to the power terminal, and
a drain connected via a third resistor to the low-potential terminal; and
an NMOS transistor having
a gate connected to the drain of the second PMOS transistor,
a source connected to the low-potential terminal, and
a drain connected to an output terminal of the control circuit.

8. The power regulator of claim 7, wherein the open detection circuit is configured to keep the transistor in the OFF state by switching the reference voltage to a constant voltage lower than the reference voltage on detecting the open state.

9. The power regulator of claim 7, wherein the control circuit includes:
a controller configured to output a control voltage based on the feedback voltage at the feedback terminal and the reference voltage; and
a driver circuit configured to output the drive voltage based on the control voltage, and
the open detection circuit is configured to control at least either of the controller and the driver circuit to keep the transistor in the OFF state on detecting the open state.

10. The power regulator of claim 7, wherein the power regulator is a linear regulator.

11. The power regulator of claim 7, wherein the power regulator is a linear regulator.

12. The power regulator of claim 7, wherein the power regulator is a switching regulator.

13. A power regulator comprising:
an input terminal arranged to receive an input voltage;
an output terminal arranged to output an output voltage;
a transistor connected to the input terminal and to the output terminal;
a feedback terminal arranged to receive a feedback voltage having a predetermined relationship with the output voltage;
an open detection circuit configured to detect an open state of the feedback terminal and, on detecting the open state, to vary the reference voltage and thereby keep the transistor in an OFF state by keeping the drive voltage at a predetermined level;
a control circuit configured to feed a drive voltage to a gate of the transistor based on the feedback voltage and a reference voltage so as to keep the output voltage constant,
wherein the control circuit includes:
a controller configured to output a control voltage based on the feedback voltage at the feedback terminal and the reference voltage; and
a driver circuit configured to output the drive voltage based on the control voltage, and
the open detection circuit being configured to keep the transistor in the OFF state by keeping the control voltage of the controller at a predetermined level on detecting the open state, wherein the open detection circuit includes:
a PNP transistor having
a base connected to the feedback terminal,
a collector connected to a low-potential terminal, and
an emitter connected via a first resistor to a power terminal;
a first PMOS transistor having
a gate connected to the emitter of the PNP transistor,
a source connected to the power terminal, and
a drain connected via a second resistor to the low-potential terminal;
a second PMOS transistor having
a gate connected to the drain of the first PMOS transistor,
a source connected to the power terminal, and
a drain connected via a third resistor to the low-potential terminal; and
an NMOS transistor having
a gate connected to the drain of the second PMOS transistor,
a source connected to the low-potential terminal, and
a drain connected to a terminal at which the collector controller outputs the control voltage.

14. The power regulator of claim 13, wherein the open detection circuit is configured to control at least either of the controller and the driver circuit to keep the transistor in the OFF state on detecting the open state.

15. The power regulator of claim 13, wherein the controller includes an error amplifier configured to output as the control voltage a difference between the feedback voltage at the feedback terminal and the reference voltage.

16. The power regulator of claim 13, wherein the open detection circuit is configured to keep the transistor in the OFF state by switching the reference voltage to a constant voltage lower than the reference voltage on detecting the open state.

17. The power regulator of claim 13, wherein the control circuit includes:
a controller configured to output a control voltage based on the feedback voltage at the feedback terminal and the reference voltage; and
a driver circuit configured to output the drive voltage based on the control voltage, and the open detection circuit is configured to control at least either of the controller and the driver circuit to keep the transistor in the OFF state on detecting the open state.

18. The power regulator of claim 13, wherein the power regulator is a switching regulator.

* * * * *